(12) United States Patent
Jiang et al.

(10) Patent No.: US 11,469,865 B2
(45) Date of Patent: Oct. 11, 2022

(54) METHOD AND DEVICE IN UE AND BASE STATION FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 129 days.

(21) Appl. No.: 17/009,795

(22) Filed: Sep. 2, 2020

(65) Prior Publication Data

US 2020/0403741 A1    Dec. 24, 2020

Related U.S. Application Data

(63) Continuation of application No. PCT/CN2019/076881, filed on Mar. 4, 2019.

(30) Foreign Application Priority Data

Mar. 14, 2018   (CN) .......................... 201810210774.5

(51) Int. Cl.
*H04L 5/00* (2006.01)
*H04W 72/04* (2009.01)

(52) U.S. Cl.
CPC ......... *H04L 5/0005* (2013.01); *H04W 72/044* (2013.01)

(58) Field of Classification Search
CPC ... H04L 27/0006; H04L 5/001; H04L 5/0092; H04L 5/0005; H04L 5/0048; H04L 5/0007; H04W 72/044; H04W 72/0453
See application file for complete search history.

(56) References Cited

U.S. PATENT DOCUMENTS

2018/0123765 A1\* 5/2018 Cao ..................... H04L 1/1861
2018/0139778 A1\* 5/2018 Chou .................... H04W 74/04
(Continued)

OTHER PUBLICATIONS

ISR in application PCT/CN2019/076881 dated Apr. 24, 2019.
(Continued)

*Primary Examiner* — Maharishi V Khirodhar
*Assistant Examiner* — Kenneth P Hunt

(57) ABSTRACT

The disclosure provides a method and device in User Equipment (UE) and base station for wireless communication. The UE receives Q1 first-type information groups, and transmits or receives a first radio signal in a first time-frequency resource according to a configuration of a first information group; the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing. The disclosure establishes an association between the frequency domain position of the first time-frequency resource and the first information group, thereby simplifying the reception of the first-type information group, improving the flexibility of scheduling of frequency domain resources on unlicensed spectrum, and improving the overall performance of the system.

16 Claims, 17 Drawing Sheets

(56) References Cited

U.S. PATENT DOCUMENTS

| | | | | |
|---|---|---|---|---|
| 2018/0199343 | A1* | 7/2018 | Deogun | H04L 5/0044 |
| 2018/0288746 | A1* | 10/2018 | Zhang | H04L 5/0048 |
| 2019/0246378 | A1* | 8/2019 | Islam | H04W 72/12 |
| 2019/0364558 | A1* | 11/2019 | Kim | H04W 72/0453 |
| 2020/0059930 | A1* | 2/2020 | Lee | H04L 27/26025 |
| 2020/0059961 | A1* | 2/2020 | Do | H04W 72/02 |
| 2020/0252180 | A1* | 8/2020 | Takeda | H04W 72/042 |
| 2020/0389914 | A1* | 12/2020 | Zhao | H04W 72/1289 |
| 2020/0404689 | A1* | 12/2020 | Zhou | H04W 4/70 |
| 2021/0058218 | A1* | 2/2021 | Harada | H04L 5/001 |

OTHER PUBLICATIONS

Spreadtrum Communications. "Remaining Issues on BWP"3GPPTSG-RAN WGI#92 R1-1801842, Mar. 2, 2018(Mar. 2, 2018),pp. I and 2.
1st Office Action in Chinese patent application No. 201810210774.5 dated Jan. 2, 2020.
1st Search Report in in Chinese patent application No. 201810210774.5 dated Dec. 18, 2019.
Supplementary Search Report in in Chinese patent application No. 201810210774.5 dated Mar. 23, 2020.
Notice of grant patenting right in Chinese patent application No. 201810210774.5 dated Apr. 1, 2020.

* cited by examiner

METHOD AND DEVICE IN UE AND BASE STATION FOR WIRELESS COMMUNICATION

CROSS REFERENCE TO RELATED APPLICATIONS

This application is a continuation of International Application No. PCT/CN2019/076881, filed Mar. 4, 2019, claims the priority benefit of Chinese Patent Application No. 201810210774.5, filed on Mar. 14, 2018, the full disclosure of which is incorporated herein by reference

BACKGROUND

Technical Field

The disclosure relates to transmission methods and devices in wireless communication systems, and in particular to a transmission method and device on unlicensed spectrum.

Related Art

At present, in 5G New Radio Access Technology (NR) Phase 1 systems, in order to support multiple subcarrier spacings in one system bandwidth, considering reasons such as terminal receiving bandwidth limited, 5G systems introduce a concept of BWP, that is, when one cell has one Component Carrier (CC) with big bandwidth, a base station can divide the big CC into multiple BWPs so as to adapt to the User Equipment (UE) with small receiving bandwidth and transmitting bandwidth capabilities; when the UE with small bandwidth capability performs communication with a cell, the UE performs downlink reception or uplink transmission on one BWP only. Meanwhile, in order to improve the flexibility and timeliness of configuration of BWP, the base station can dynamically switch a BWP employing Downlink Control Information (DCI) containing scheduling, and the BWP that can be dynamically switched is configured for a terminal through a UE-specific higher-layer signaling.

In future 5G NR Phase 2 and following evolved releases, standalone Licensed Assisted Access (LAA) scenarios will be discussed; however, in standalone LAA, dynamic switch of BWP and corresponding configuration methods need to be designed again.

SUMMARY

At present, in 5G NR systems, a base station configures for each terminal up to four downlink BWPs and up to four uplink BWPs, and triggers switching between the above configured BWPs through physical layer dynamic signalings. The base station configures, for each BWP, a bandwidth, a subcarrier spacing, a frequency domain position, a Cyclic Prefix (CP) type and other configuration information to use for the transmission on the BWP. In standalone-LAA, one typical application scenario is that the base station performs separate energy detections on the multiple BWPs in one system bandwidth and schedules a terminal to an unoccupied BWP among the multiple BWPS to perform data transmission. Since the base station does not know which BWP is not occupied by another terminal before initiating transmission, the above configuration method based on each BWP is no longer applicable.

One simple method for the above problem is that: the base station configures a group of cell-specific configuration information for all potential BWPs, the above configuration information is one-to-one corresponding to absolute frequency domain resources occupied by a corresponding BWP, and the terminal employs corresponding configuration information when performing transmission on one BWP. However, the above method has two problems. The first problem is that the terminal needs to receive the configuration information of all potential BWPs, which increases the complexity of reception of the terminal; the second problem is that the above configuration information is the same for all terminals, that is to say, when two terminals perform transmission while occupying same frequency domain resources, the two terminals can only employ same BWP configuration information, which increases limits of scheduling, reduces efficiency of spectrum and reduces flexibility of scheduling In view of the above problems and analysis, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for wireless communication, wherein the method includes:

receiving Q1 first-type information groups; and first operating a first radio signal in a first time-frequency resource according to a configuration of a first information group.

Herein, the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first operating is transmitting, or the first operating is receiving.

In one embodiment, the above method has the following benefits: determination of the first information group from the Q1 first-type information groups is realized through the frequency domain position of the first time-frequency resource; when the frequency domain position of the first time-frequency resource dynamically switches between multiple BWPs, the corresponding first information group is dynamically selected from the Q1 first-type information groups. The above method enables the Q1 first-type information groups to change with unoccupied BWPs detected by a base station, without making the Q1 first-type information groups one-to-one corresponding to all possible unoccupied BWPs. Thus, the above method improves flexibility of scheduling and reflects properties of UE-specific BWP configuration.

In one embodiment, the above method has another following benefit: the Q1 first-type information groups correspond to Q1 Virtual BWPs (V-BWPs), the Q1 V-BWPs are acquired by a base station through channel detections, and the Q1 V-BWPs may correspond to different frequency domain resources at different instants of time; when there are a lot of potential unlicensed BWPs under one base station, the base station only needs to configure a small number (Q1) of first-type information groups, and the UE will make the Q1 first-type information groups corresponding to Q1 unoccupied BWPs according to a number of actually unoccupied BWPs; thus, signaling overheads are saved and operations of the UE are simplified.

According to one aspect of the disclosure, the above method includes:

determining K1 candidate subband(s).

Herein, the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer.

In one embodiment, the above method has the following benefits: the subband in the disclosure corresponds to a BWP; which one of the Q1 first-type information groups is employed by the first subband is determined by a position of the first subband in the K1 candidate subband(s), rather than being known in advance by the UE; the above method is more suitable for scenarios in which the frequency domain position of a BWP used for actual transmission is not determinate on unlicensed spectrum.

According to one aspect of the disclosure, the above method includes:

receiving a first signaling group.

Herein, the first signaling group is used for indicating K1 candidate subband(s); the first signaling group includes K2 physical layer signaling(s), and the K2 is a positive integer.

In one embodiment, the above method has the following benefits: the K1 candidate subband(s) is(are) indicated through a physical layer dynamic signaling, thereby timely informing the UE of subsequent operations on the K1 candidate subband(s).

In one embodiment, the above method has another following benefit: the first signaling group may be transmitted on one BWP, thereby reducing complexity of blind detection and latency of processing of the UE.

According to one aspect of the disclosure, the above method includes:

receiving first information.

Herein, the first information is used for indicating M1 first-type subband(s); the K1 candidate subband(s) is(are) a subset belonging to the M1 first-type subband(s); the M1 is a positive integer not less than the K1; and the first information is transmitted through an air interface.

In one embodiment, the above method has the following benefits: frequency domain resources occupied by the M1 first-type subband(s) are cell-specific and do not change dynamically, which is convenient for the UE to receive and interpret and will not cause ambiguity.

According to one aspect of the disclosure, the above method includes:

detecting K1 first-type reference signal(s) in the M1 first-type subband(s).

Herein, a detection(s) for the K1 first-type reference signal(s) is(are) used for determining the K1 candidate subband(s).

In one embodiment, the above method has the following benefits: the first-type reference signal similar to a Discovery Reference Signal (DRS) helps the UE to determine, one step ahead, the K1 candidate subband(s) occupied by the base station, thereby reducing complexity of reception of the UE and reducing probability of error detection of DCI.

Second operating a second radio signal in a second time-frequency resource according to a configuration of a second information group.

Herein, the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second operating is transmitting, or the second operating is receiving.

In one embodiment, the above method has the following benefits: no matter transmission occurs on which subband, only if the position of the subband in the K1 candidate subband(s) remains unchanged, the BWP configuration information corresponding to the subband keeps unchanged; that is to say, frequency domain resources corresponding to the first information group are the first time-frequency resource at a first instant of time and the second time-frequency resource at a second instant of time. The above method is more suitable for scenarios in which the frequency domain position of a BWP used for transmission is not determinate on unlicensed spectrum.

The disclosure provides a method in a base station for wireless communication, wherein the method includes:

transmitting Q1 first-type information groups; and first processing a first radio signal in a first time-frequency resource according to a configuration of a first information group.

Herein, the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first processing is receiving, or the first processing is transmitting.

According to one aspect of the disclosure, the above method includes:

determining K1 candidate subband(s).

Herein, the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer;

According to one aspect of the disclosure, the above method includes:

transmitting a first signaling group.

Herein, the first signaling group is used for indicating K1 candidate subband(s); the first signaling group includes K2 physical layer signaling(s), and the K2 is a positive integer.

According to one aspect of the disclosure, the above method includes:

transmitting first information.

Herein, the first information is used for indicating M1 first-type subband(s); the K1 candidate subband(s) is(are) a subset belonging to the M1 first-type subband(s); the M1 is a positive integer not less than the K1; and the first information is transmitted through an air interface.

According to one aspect of the disclosure, the above method includes:

performing M1 energy detection(s) for the M1 first-type subband(s) respectively; and transmitting K1 first-type reference signal(s) in the K1 candidate subband(s) respectively.

Herein, the M1 energy detection(s) is(are) used for determining that the K1 candidate subband(s) is(are) not occupied, and a detection(s) for the K1 first-type reference signal(s) is(are) used for determining the K1 candidate subband(s).

According to one aspect of the disclosure, the above method includes:

second processing a second radio signal in a second time-frequency resource according to a configuration of a second information group.

Herein, the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second processing is receiving, or the second processing is transmitting.

The disclosure provides a UE for wireless communication, wherein the UE includes:

a first receiver, to receive Q1 first-type information groups; and a first transceiver, to first operate a first radio signal in a first time-frequency resource according to a configuration of a first information group.

Herein, the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first operate is transmit, or the first operate is receive.

In one embodiment, the above UE for wireless communication is characterized in that: the first transceiver further determines K1 candidate subband(s); the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer.

In one embodiment, the above UE for wireless communication is characterized in that: the first transceiver further receives a first signaling group; the first signaling group is used for indicating K1 candidate subband(s); the first signaling group includes K2 physical layer signaling(s), and the K2 is a positive integer.

In one embodiment, the above UE for wireless communication is characterized in that: the first transceiver further receives first information; the first information is used for indicating M1 first-type subband(s); the K1 candidate subband(s) is(are) a subset belonging to the M1 first-type subband(s); the M1 is a positive integer not less than the K1; and the first information is transmitted through an air interface.

In one embodiment, the above UE for wireless communication is characterized in that: the first transceiver further detects K1 first-type reference signal(s) in the M1 first-type subband(s); and a detection(s) for the K1 first-type reference signal(s) is(are) used for determining the K1 candidate subband(s).

In one embodiment, the above UE for wireless communication is characterized in that: the first transceiver further second operates a second radio signal in a second time-frequency resource according to a configuration of a second information group; the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second operate is transmit, or the second operate is receive.

The disclosure provides a base station for wireless communication, wherein the base station includes:

a first transmitter, to transmit Q1 first-type information groups; and a second transceiver, to first process a first radio signal in a first time-frequency resource according to a configuration of a first information group.

Herein, the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first process is receive, or the first process is transmit.

In one embodiment, the above base station for wireless communication is characterized in that: the second transceiver further determines K1 candidate subband(s); the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer.

In one embodiment, the above base station for wireless communication is characterized in that: the second transceiver further transmits a first signaling group; the first signaling group is used for indicating K1 candidate subband(s); the first signaling group includes K2 physical layer signaling(s), and the K2 is a positive integer.

In one embodiment, the above base station for wireless communication is characterized in that: the second transceiver further transmits first information; the first information is used for indicating M1 first-type subband(s); the K1 candidate subband(s) is(are) a subset belonging to the M1 first-type subband(s); the M1 is a positive integer not less than the K1; and the first information is transmitted through an air interface.

In one embodiment, the above base station for wireless communication is characterized in that: the second transceiver further performs M1 energy detection(s) for the M1 first-type subband(s) respectively; the second transceiver transmits K1 first-type reference signal(s) in the K1 candidate subband(s) respectively; the M1 energy detection(s) is(are) used for determining that the K1 candidate subband(s) is(are) not occupied, and a detection(s) for the K1 first-type reference signal(s) is(are) used for determining the K1 candidate subband(s).

In one embodiment, the above base station for wireless communication is characterized in that: the second transceiver second processes a second radio signal in a second time-frequency resource according to a configuration of a second information group; the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second process is receive, or the second process is transmit.

In one embodiment, compared with conventional schemes, the disclosure has the following advantages.

Determination of the first information group from the Q1 first-type information groups is realized through the frequency domain position of the first time-frequency resource; when the frequency domain position of the first time-frequency resource dynamically switches between multiple BWPs, the corresponding first information group is dynamically selected from the Q1 first-type information groups. The above method enables the Q1 first-type information groups to change with unoccupied BWPs detected by a base station, without making the Q1 first-type information groups one-to-one corresponding to all possible unoccupied BWPs. Thus, the above method improves flexibility of scheduling and reflects properties of UE-specific BWP configuration.

The Q1 first-type information groups correspond to Q1 V-BWPs, the Q1 V-BWPs are acquired by a base station through channel detections, and the Q1 V-BWPs may correspond to different frequency domain resources at different instants of time; when there are a lot of potential unlicensed BWPs under one base station, the base station only needs to configure a small number (Q1) of first-type information groups, and the UE will make the Q1 first-type information groups corresponding to Q1 unoccupied BWPs according to a number of actually unoccupied BWPs; thus, signaling overheads are saved and operations of the UE are simplified.

The subband in the disclosure corresponds to a BWP; which one of the Q1 first-type information groups is employed by the first subband is determined by a position of the first subband in the K1 candidate subband(s), rather than being known in advance by the UE; the above method is more suitable for scenarios in which the frequency domain position of a BWP used for actual transmission is not determinate on unlicensed spectrum.

The K1 candidate subband(s) is(are) dynamically indicated through the first signaling group, thereby timely informing the UE of subsequent operations on the K1 candidate subband(s). The first signaling group may be transmitted on one BWP, thereby reducing complexity of blind detection and latency of processing of the UE.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if there is no conflict.

Embodiment 1

Figure 1:
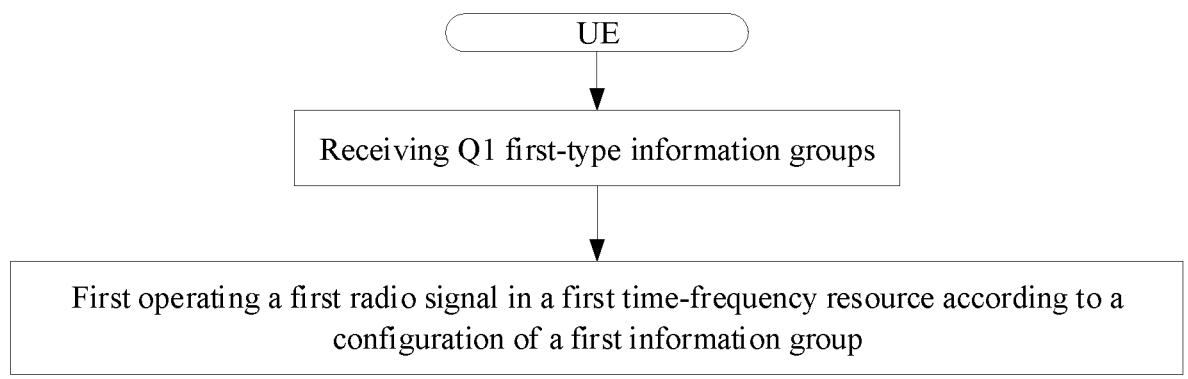
FIG. 1 is a flowchart of Q1 first-type information groups according to one embodiment of the disclosure.

Embodiment 1 illustrates a flowchart of Q1 first-type information groups, as shown in FIG. 1.

In Embodiment 1, the UE in the disclosure first receives Q1 first-type information groups, and then first operates a first radio signal in a first time-frequency resource according to a configuration of a first information group; the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first operating is transmitting, or the first operating is receiving.

In one subembodiment, the phrase that a frequency domain position of the first time-frequency resource is used for determining the first information group from the Q1 first-type information groups refers that: frequency domain resources occupied by the first time-frequency resource belong to a first subband, the first subband is one of Q1 candidate subbands, the first subband employs relevant information included in the first information group, and an index of the first subband in the Q1 candidate subbands is used for determining the first information group from the Q1 first-type information groups.

In one affiliated embodiment of the above subembodiment, the phrase that an index of the first subband in the Q1 candidate subbands is used for determining the first information group from the Q1 first-type information groups refers that: indexes of the Q1 candidate subbands are 0 to (Q1−1) respectively, an index of the first subband in the Q1 candidate subbands is q, the first information group is the (q+1)th first-type information among the Q1 first-type information groups, and the q is a positive integer not less than 0 but not greater than (Q1−1).

In one affiliated embodiment of the above subembodiment, the Q1 candidate subbands are arranged in an order from low to high according to center frequency points.

In one affiliated embodiment of the above subembodiment, the Q1 candidate subbands are arranged in an order from low to high according to frequency points of lowest subcarriers.

In one affiliated embodiment of the above subembodiment, the Q1 candidate subbands are arranged in an order from low to high according to frequency points of highest subcarriers.

In one affiliated embodiment of the above subembodiment, the Q1 candidate subbands are arranged in an order appearing in a configuration signaling.

In one subembodiment, the phrase that a frequency domain position of the first time-frequency resource is used for determining the first information group from the Q1 first-type information groups refers that: frequency domain resources occupied by the first time-frequency resource are a first Physical Resource Block (PRB) set, the first PRB set is one of Q1 candidate PRB sets, the first radio signal employs relevant information included in the first information group, and an index of the first PRB set in the Q1 candidate PRB sets is used for determining the first information group from the Q1 first-type information groups.

In one affiliated embodiment of the above subembodiment, the phrase that an index of the first PRB set in the Q1 candidate PRB sets is used for determining the first information group from the Q1 first-type information groups refers that: indexes of the Q1 candidate PRB sets are 0 to (Q1−1) respectively, an index of the first PRB set in the Q1 candidate PRB sets is q, the first information group is the (q+1)th first-type information among the Q1 first-type information groups, and the q is a positive integer not less than 0 but not greater than (Q1−1).

In one affiliated embodiment of the above subembodiment, the Q1 candidate PRB sets are arranged in an order from low to high according to center frequency points.

In one affiliated embodiment of the above subembodiment, the Q1 candidate PRB sets are arranged in an order from low to high according to frequency points of lowest subcarriers occupied.

In one affiliated embodiment of the above subembodiment, the Q1 candidate PRB sets are arranged in an order from low to high according to frequency points of highest subcarriers occupied.

In one affiliated embodiment of the above subembodiment, the Q1 candidate PRB sets are arranged in an order appearing in a configuration signaling.

In one affiliated embodiment of the above subembodiment, any one of the Q1 candidate PRB sets includes a positive integer number of consecutive PRB(s) in frequency domain.

In one subembodiment, each of the Q1 first-type information groups includes an index.

In one subembodiment, any two of the Q1 first-type information groups have different indexes.

In one subembodiment, indexes of the Q1 first-type information groups are 0, 1, 2, . . . , (Q1−1) respectively.

In one subembodiment, indexes of the Q1 first-type information groups are all non-negative integers.

In one subembodiment, the relevant information to a subcarrier spacing included in each of the Q1 first-type information groups indicates a subcarrier gap or subcarrier spacing of a multicarrier symbol.

In one subembodiment, the multicarrier symbol in the disclosure is one of an Frequency Division Multiplexing (OFDM) symbol, a Single-Carrier Frequency Division Multiple Access (SC-FDMA) symbol, a Filter Bank Multi Carrier (FBMC) symbol, an OFDM symbol including a CP or a Discrete Fourier Transform Spreading Orthogonal Frequency Division Multiplexing (DFT-s-OFDM) including a CP.

In one subembodiment, the relevant information to a subcarrier spacing included in each of the Q1 first-type information groups indicates one of 15 kHz, 30 kHz, 60 kHz, 120 kHz 240 kHz or 480 kHz.

In one subembodiment, the relevant information to a CP included in each of the Q1 first-type information groups indicates one candidate time length from P1 candidate time lengths, and the P1 is a positive integer greater than 1.

In one affiliated embodiment of the above subembodiment, the P1 is 2.

In one subembodiment, the relevant information to a CP included in each of the Q1 first-type information groups indicates one candidate CP type from P2 candidate CP types, and the P2 is a positive integer greater than 1.

In one affiliated embodiment of the above subembodiment, the P2 candidate CP types include a normal CP and an extended CP.

In one affiliated embodiment of the above subembodiment, the P2 is 2.

In one subembodiment, the relevant information to a bandwidth included in each of the Q1 first-type information groups indicates one candidate bandwidth from P3 candidate bandwidths, and the P3 is a positive integer greater than 1.

In one affiliated embodiment of the above subembodiment, the P3 candidate bandwidths include at least one of 1.44M, 5M, 10M, 15M, 20M, 50M, 100M, 200M.

In one affiliated embodiment of the above subembodiment, any one of the P3 candidate bandwidths includes a positive integer number of consecutive PRBs in frequency domain.

In one affiliated embodiment of the above subembodiment, the P3 candidate bandwidths at least include a first candidate bandwidth and a second candidate bandwidth, the first candidate bandwidth includes R1 consecutive PRBs in frequency domain, the second candidate bandwidth includes R2 consecutive PRBs in frequency domain, the R1 and the R2 are both positive integers, and the R1 is not equal to the R2.

In one subembodiment, each of the Q1 first-type information groups includes relevant configuration information to a Physical Downlink Control Channel (PDCCH).

In one affiliated embodiment of the above subembodiment, the relevant configuration information to a PDCCH includes partial or all fields in a PDCCH-Config Information Element (IE) in TS 38.331.

In one affiliated embodiment of the above subembodiment, the relevant configuration information to a PDCCH includes partial or all fields in a ControlResourceSet in TS 38.331.

In one affiliated embodiment of the above subembodiment, each of the Q1 first-type information groups includes one first-type index, and the first-type index is a controlResourceSetId in TS 38.331.

In one subembodiment, each of the Q1 first-type information groups includes relevant configuration information to a Physical Downlink Shared Channel (PDSCH).

In one affiliated embodiment of the above subembodiment, the relevant configuration information to a PDSCH includes partial or all fields in a PDSCH-Config in TS 38.331.

In one affiliated embodiment of the above subembodiment, the relevant configuration information to a PDSCH includes partial or all fields in a rateMatchResourcesPDSCH in TS 38.331.

In one affiliated embodiment of the above subembodiment, the relevant configuration information to a PDSCH includes partial or all fields in a Resource-set-group-1 in TS 38.331.

In one affiliated embodiment of the above subembodiment, the relevant configuration information to a PDSCH includes partial or all fields in a Resource-set-group-2 in TS 38.331.

In one subembodiment, each of the Q1 first-type information groups includes partial or all fields in relevant configuration information to a Phase Tracking Reference Signal (PTRS).

In one affiliated embodiment of the above subembodiment, the relevant configuration information to a PTRS includes partial or all fields in a Downlink-PTRS-Confi in TS 38.331.

In one affiliated embodiment of the above subembodiment, the relevant configuration information to a PTRS includes partial or all fields in an Uplink-PTRS-Confi in TS 38.331.

In one subembodiment, each of the Q1 first-type information groups includes relevant configuration information to a Channel State Information Reference Signal (CSI-RS).

In one affiliated embodiment of the above subembodiment, the relevant configuration information to a CSI-RS includes partial or all fields in a CSI-ResourceConfig in TS 38.331.

In one affiliated embodiment of the above subembodiment, each of the Q1 first-type information groups includes one first-type index, and the first-type index is a csi-ResourceConfigId in TS 38.331.

In one affiliated embodiment of the above subembodiment, each of the Q1 first-type information groups includes one first-type index, and the first-type index is a csi-ResourceSetId in TS 38.331.

In one subembodiment, each of the Q1 first-type information groups includes relevant configuration information to a Sounding Reference Signal (SRS).

In one affiliated embodiment of the above subembodiment, the relevant configuration information to an SRS includes partial or all fields in an SRS-Config in TS 38.331.

In one affiliated embodiment of the above subembodiment, the relevant configuration information to an SRS includes partial or all fields in an SRS-ResourceSet in TS 38.331.

In one affiliated embodiment of the above subembodiment, the relevant configuration information to an SRS includes partial or all fields in an SRS-Resource in TS 38.331.

In one affiliated embodiment of the above subembodiment, each of the Q1 first-type information groups includes one first-type index, and the first-type index is an srs-ResourceSetId in TS 38.331.

In one affiliated embodiment of the above subembodiment, each of the Q1 first-type information groups includes one first-type index, and the first-type index is an srs-ResourceIds in TS 38.331.

In one subembodiment, each of the Q1 first-type information groups includes relevant configuration information to a Semi-Persistent Scheduling (SPS).

In one affiliated embodiment of the above subembodiment, the relevant configuration information to an SPS includes partial or all fields in an SPS-Config in TS 38.331.

Embodiment 2

Figure 2:
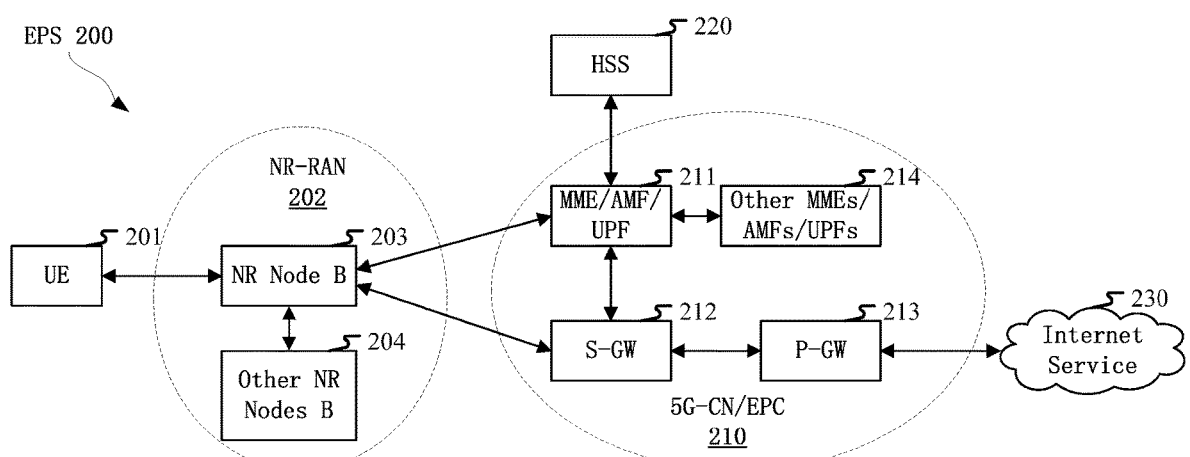
FIG. 2 is a diagram illustrating a network architecture according to one embodiment of the disclosure.

Embodiment 2 illustrates a diagram for a network architecture, as shown in FIG. 2.

Embodiment 2 illustrates a diagram of a network architecture according to the disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes a NR node (gNB) 203 and other NR nodes 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 supports wireless communication of data transmission on unlicensed spectrum.

In one subembodiment, the gNB 203 supports wireless communication of data transmission on unlicensed spectrum.

In one subembodiment, the UE 201 supports dynamic switching between multiple BWPs.

In one subembodiment, the gNB 203 supports dynamic switching between multiple BWPs.

In one subembodiment, the UE 201 supports carrier listening based on BWP.

In one subembodiment, the gNB 203 supports carrier listening based on BWP.

Embodiment 3

Figure 3:
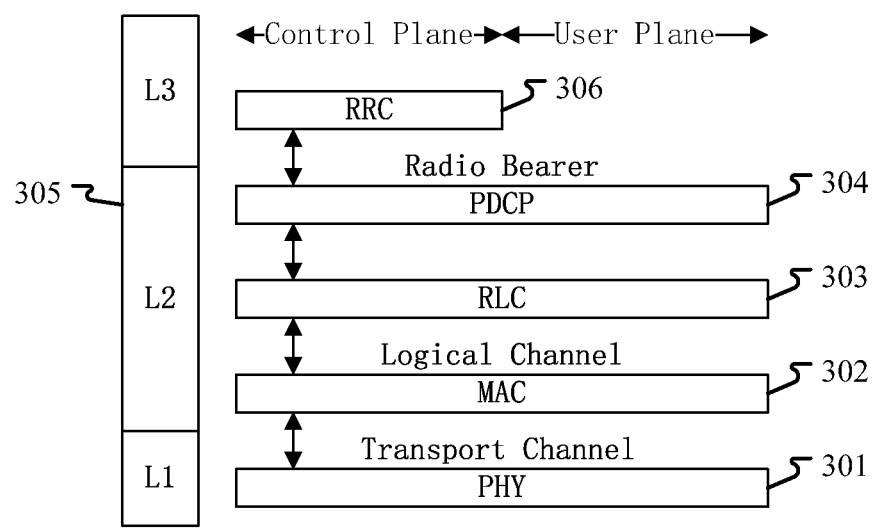
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer termi-nated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the Q1 first-type information groups in the disclosure are generated on the RRC sublayer 306.

In one subembodiment, the first radio signal in the disclosure is generated on the PHY 301.

In one subembodiment, the first signaling group in the disclosure is generated on the PHY 301.

In one subembodiment, the first information in the disclosure is generated on the RRC sublayer 306.

In one subembodiment, the K1 first-type reference signals in the disclosure are generated on the PHY 301.

In one subembodiment, the second radio signal in the disclosure is generated on the PHY 301.

Embodiment 4

Figure 4:
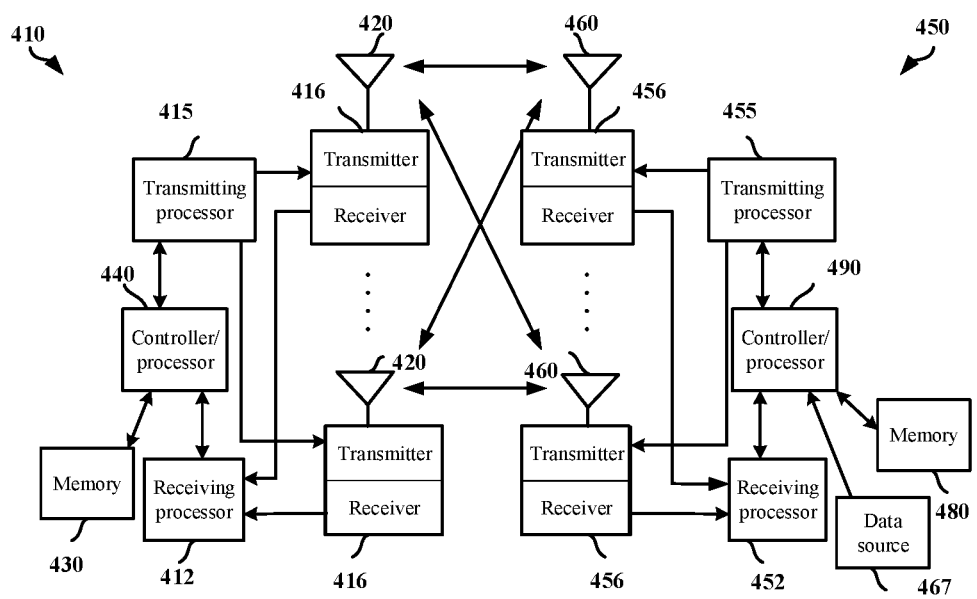
FIG. 4 is a diagram illustrating an evolved node B and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In UL transmission, processes relevant to the base station 410 include the following.

The receiver 416 receives a radio-frequency signal received via the corresponding antenna 420, converts the received radio-frequency signal into a baseband signal and provides the baseband signal to the receiving processor 412.

The receiving processor 412 performs various signal receiving processing functions of an L1 layer (that is, PHY), including decoding, de-interleaving, descrambling, demodulation, extraction of physical layer control signaling, etc.

The receiving processor 412 performs various signal receiving processing functions of an L1 layer (that is, PHY), including multiantenna receiving, despreading, code division multiplexing, precoding, etc.

The controller/processor 440 performs functions of L2 layer, and is connected to the memory 430 that stores program code and data.

The controller/processor 440 provides de-multiplexing between a logical channel and a transport channel, packet reassembling, decryption, header decompression and control signaling processing to recover a higher-layer packet coming from the UE 450. The higher-layer packet coming from the controller/processor 440 may be provided to the core network.

In Uplink (UL) transmission, processes relevant to the UE 450 include the following.

The data source 467 provides a higher-layer packet to the controller/processor 490. The data source 467 represents all protocol layers above L2 layer.

The transmitter 456 transmits a radio-frequency signal via the corresponding antenna 460, converts a baseband signal into a radio-frequency signal and provides the radio-frequency radio to the corresponding antenna 460.

The transmitting processor 455 performs various signal receiving processing functions of an L1 layer (that is, PHY), including encoding, interleaving, scrambling, modulation and generation of physical layer control signalings, etc.

The transmitting processor 455 performs various signal receiving processing functions of an L1 layer (that is, PHY), including multiantenna transmitting, spreading, code division multiplexing, precoding, etc.

The controller/processor 490 provides header compression, encryption, packet segmentation and reordering, multiplexing between a logical channel and a transport channel based on radio resource allocation of the gNB 410, to implement the L2 functions used for the user plane and the control plane.

The controller/processor 459 is also in charge of HARQ operation, retransmission of lost packets, and signalings to the gNB 410.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit for transmission requirements, and the scheduling unit is configured to schedule air interface resources corresponding to transmission requirements.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The transmitting processor 415 receives a bit stream output from the controller/processor 440, and performs various signal transmitting processing functions of L1 layer (that is, PHY), including multiantenna transmitting, spreading, code division multiplexing, precoding, etc.

The transmitter 416 is configured to convert the baseband signal provided by the transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In Downlink (DL) transmission, processes relevant to the UE 450 include the following.

The receiver 456 is configured to convert a radio-frequency signal received via the antenna 460 into a baseband signal and provide the baseband signal to receiving processor 452.

The receiving processor 452 performs various signal receiving processing functions of an L1 layer (that is, PHY), including decoding, de-interleaving, descrambling, demodulation, extraction of physical layer control signaling, etc.

The receiving processor 452 performs various signal receiving processing functions of an L1 layer (that is, PHY), including multiantenna receiving, despreading, code division multiplexing, precoding, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In one subembodiment, the UE 450 includes at least one processor and at least one memory. The at least one memory includes computer program codes. The at least one memory and the computer program codes are configured to be used in collaboration with the at least one processor. The UE 450 at least receives Q1 first-type information groups, and first operates a first radio signal in a first time-frequency resource according to a configuration of a first information group; the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first operate is transmit, or the first operate is receive.

In one subembodiment, the UE 450 includes a memory that stores a computer readable instruction program. The computer readable instruction program generates an action when executed by at least one processor. The action includes: receiving Q1 first-type information groups, and first operating a first radio signal in a first time-frequency resource according to a configuration of a first information group; the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first operating is transmitting, or the first operating is receiving.

In one subembodiment, the gNB 410 device includes at least one processor and at least one memory. The at least one memory includes computer program codes. The at least one memory and the computer program codes are configured to be used in collaboration with the at least one processor. The gNB 410 at least transmits Q1 first-type information groups, and first processes a first radio signal in a first time-frequency resource according to a configuration of a first information group; the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first process is receive, or the first process is transmit.

In one embodiment, the gNB 410 includes a memory that stores a computer readable instruction program. The computer readable instruction program generates an action when executed by at least one processor. The action includes transmitting Q1 first-type information groups, and first processing a first radio signal in a first time-frequency resource according to a configuration of a first information group; the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first processing is receiving, or the first processing is transmitting.

In one subembodiment, the UE 450 corresponds to the UE in the disclosure.

In one subembodiment, the gNB 410 corresponds to the base station in the disclosure.

In one subembodiment, at least the former two of the receiver 456, the receiving processor 452 and the controller/processor 490 are used for receiving Q1 first-type information groups.

In one subembodiment, at least the former two of the receiver 456, the receiving processor 452 and the controller/processor 490 are used for receiving a first radio signal in a first time-frequency resource according to a configuration of a first information group.

In one subembodiment, at least the former two of the transmitter 456, the transmitting processor 455 or the controller/processor 490 are used for transmitting a first radio signal in a first time-frequency resource according to a configuration of a first information group.

In one subembodiment, at least one of the receiving processor 452 and the controller/processor 490 is used for determining K1 candidate subband(s).

In one subembodiment, at least the former two of the receiver 456, the receiving processor 452 and the controller/processor 490 are used for receiving a first signaling group.

In one subembodiment, at least the former two of the receiver 456, the receiving processor 452 and the controller/processor 490 are used for receiving first information.

In one subembodiment, at least the former two of the receiver 456, the receiving processor 452 and the controller/processor 490 are used for detecting K1 first-type reference signal(s) in the M1 first-type subband(s).

In one subembodiment, at least the former two of the receiver 456, the receiving processor 452 and the controller/processor 490 are used for receiving a second radio signal in a second time-frequency resource according to a configuration of a second information group.

In one subembodiment, at least the former two of the transmitter 456, the transmitting processor 455 or the controller/processor 490 are used for transmitting a second radio signal in a second time-frequency resource according to a configuration of a second information group.

In one subembodiment, at least the former two of the transmitter 416, the transmitting processor 415 and the controller/processor 440 are used for transmitting Q1 first-type information groups.

In one subembodiment, at least the former two of the transmitter 416, the transmitting processor 415 and the controller/processor 440 are used for transmitting a first radio signal in a first time-frequency resource according to a configuration of a first information group.

In one subembodiment, at least the former two of the receiver 416, the receiving processor 412 and the controller/processor 440 are used for receiving a first radio signal in a first time-frequency resource according to a configuration of a first information group.

In one subembodiment, at least the former two of the receiver 416, the receiving processor 412 and the controller/processor 440 are used for determining K1 candidate subband(s).

In one subembodiment, at least the former two of the transmitter 416, the transmitting processor 415 and the controller/processor 440 are used for transmitting a first signaling group.

In one subembodiment, at least the former two of the transmitter 416, the transmitting processor 415 and the controller/processor 440 are used for transmitting first information.

In one subembodiment, at least the former two of the receiver 416, the receiving processor 412 and the controller/processor 440 are used for performing M1 energy detection(s) for the M1 first-type subband(s) respectively.

In one subembodiment, at least the former two of the transmitter 416, the transmitting processor 415 and the controller/processor 440 are used for transmitting K1 first-type reference signal(s) in the K1 candidate subband(s) respectively.

In one subembodiment, at least the former two of the transmitter 416, the transmitting processor 415 and the controller/processor 440 are used for transmitting a second radio signal in a second time-frequency resource according to a configuration of a second information group.

In one subembodiment, at least the former two of the receiver 416, the receiving processor 412 and the controller/processor 440 are used for receiving a second radio signal in a second time-frequency resource according to a configuration of a second information group.

Embodiment 5

Figure 5:
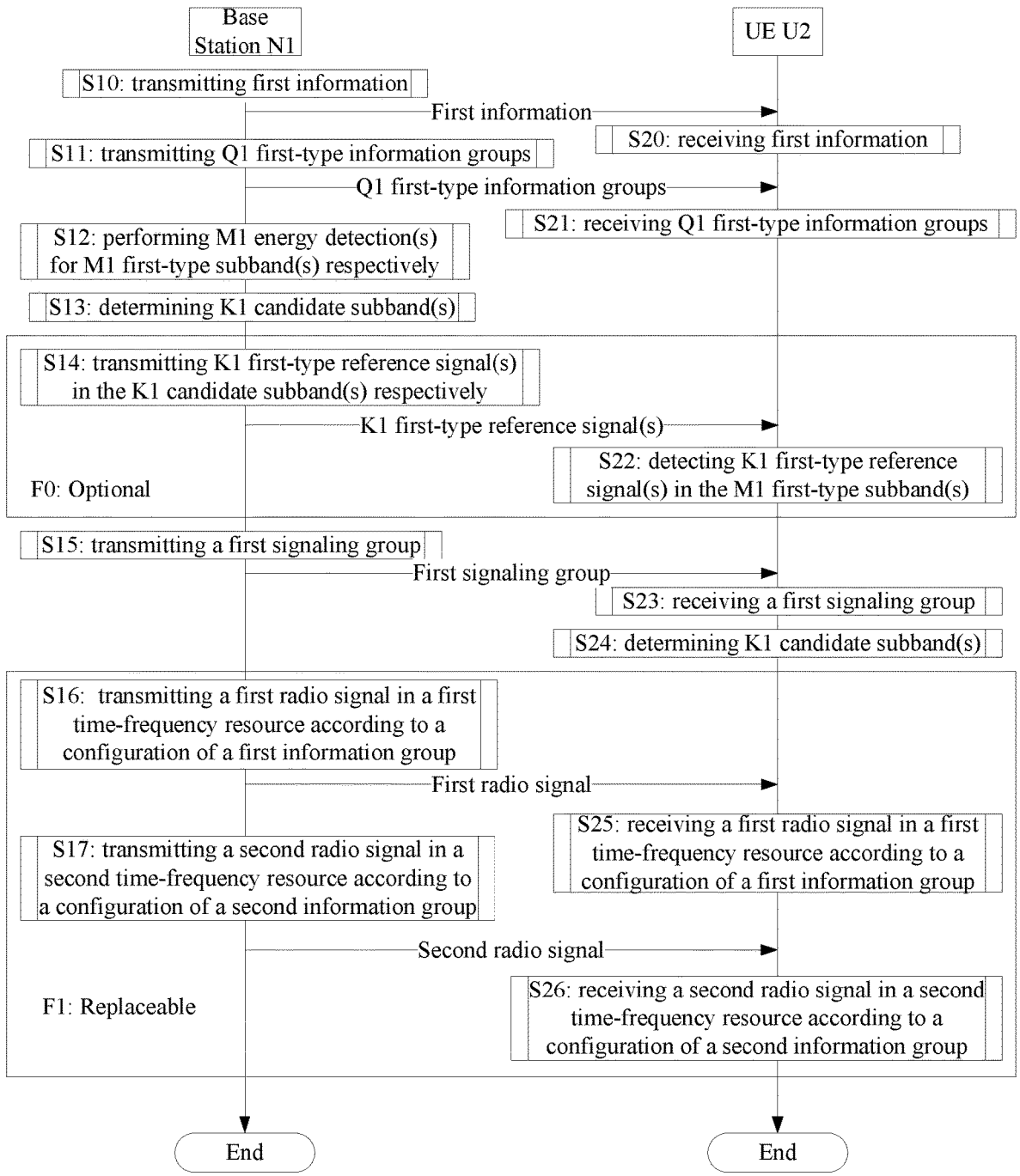
FIG. 5 is a flowchart of a first radio signal according to one embodiment of the disclosure.

Embodiment 5 illustrates a flowchart of a first radio signal, as shown in FIG. 5. In FIG. 5, a base station N1 is a maintenance base station for a serving cell of a UE U2. In FIG. 5, steps in box F0 are optional, and steps in box F1 may be replaced by steps in Embodiment 6, Embodiment 7 or Embodiment 8.

The base station N1 transmits first information in S10, transmits Q1 first-type information groups in S11, performs M1 energy detection(s) for M1 first-type subband(s) respectively in S12, determines K1 candidate subband(s) in S13, transmits K1 first-type reference signal(s) in the K1 candidate subband(s) respectively in S14, transmits a first signaling group in S15, transmits a first radio signal in a first time-frequency resource according to a configuration of a first information group in S16, and transmits a second radio signal in a second time-frequency resource according to a configuration of a second information group in S17.

The UE U2 receives first information in S20, receives Q1 first-type information groups in S21, detects K1 first-type reference signal(s) in the M1 first-type subband(s) in S22, receives a first signaling group in S23, determines K1 candidate subband(s) in S24, receives a first radio signal in a first time-frequency resource according to a configuration of a first information group in S25, and receives a second radio signal in a second time-frequency resource according to a configuration of a second information group in S26.

In Embodiment 5, the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer; the first signaling group is used for indicating K1 candidate subband(s); the first signaling group includes K2 physical layer signaling(s), and the K2 is a positive integer; the first information is used for indicating M1 first-type subband(s); the K1 candidate subband(s) is(are) a subset belonging to the M1 first-type subband(s); the M1 is a positive integer not less than the K1; the first information is transmitted through an air interface; the M1 energy detection(s) is(are) used for determining that the K1 candidate subband(s) is(are) not occupied, and a detection(s) for the K1 first-type reference signal(s) is(are) used for determining the K1 candidate subband(s); the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related.

In one subembodiment, any one of the K1 candidate subband(s) is one BWP.

In one subembodiment, any one of the K1 candidate subband(s) is one CC.

In one subembodiment, the K1 is greater than 1, and any two of the K1 candidate subbands have a same bandwidth.

In one subembodiment, the K1 is greater than 1, and any two of the K1 candidate subbands have different bandwidths.

In one subembodiment, the K1 is greater than 1, and any two of the K1 candidate subbands are orthogonal (not overlapping) in frequency domain.

In one subembodiment, at least two of the K1 candidate subbands employ different subcarrier spacings.

In one subembodiment, the K2 is not greater than the K1.

In one subembodiment, any one of the K2 physical layer signalings is a physical layer signaling other than UE-specific physical layer signalings.

In one subembodiment, any one of the K2 physical layer signalings is cell-specific.

In one subembodiment, any one of the K2 physical layer signalings is terminal group-specific, and the UE U2 belongs to the terminal group.

In one subembodiment, the K2 is equal to 1, and the K2 physical layer signaling is one first DCI.

In one affiliated embodiment of the above subembodiment, the first DCI is transmitted in one given candidate subband among the K1 candidate subband(s).

In one example of the above affiliated embodiment, the given candidate subband is one candidate subband with a lowest frequency point among the K1 candidate subband(s).

In one example of the above affiliated embodiment, the given candidate subband is one candidate subband with a highest frequency point among the K1 candidate subband(s).

In one affiliated embodiment of the above subembodiment, the first DCI is transmitted in each one of the K1 candidate subband(s).

In one affiliated embodiment of the above subembodiment, the first DCI indicates a first frequency domain resource, and the K1 candidate subband(s) is(are) composed of all first-type subbands among the M1 first-type subband(s) that belong to the first frequency domain resource.

In one example of the above affiliated embodiment, a given first-type subband is any one of the M1 first-type subband(s), and the given first-type subband includes C1 subcarrier(s); if one of the C1 subcarrier(s) does not belong to the first frequency domain resource, the given first-type subband does not belong to the first frequency domain resources.

In one example of the above affiliated embodiment, a given first-type subband is any one of the K1 first-type subband(s), the given first-type subband includes a given Resource Block (RB) set, and the given RB set is assigned to the UE U2 to monitor a DCI; if frequency domain resources included in the given RB set belong to the first frequency domain resource, the given first-type subband belongs to the first frequency domain resource; otherwise, the given first-type subband does not belong to the first frequency domain resource.

In a special case of the above example, the given RB set corresponds to one Control Resource Set (CORESET).

In a special case of the above example, the given RB set corresponds to one search space.

In one affiliated embodiment of the above subembodiment, the first DCI includes a first field, and the first field is used for indicating the K1 candidate subband(s) from the M1 first-type subband(s).

In one example of the above affiliated embodiment, the first field is one bitmap.

In one example of the above affiliated embodiment, the first field includes M1 bit(s), and the M1 bit(s) correspond(s) to M1 first-type subband(s) respectively.

In a special case of the above example, a given bit is any one of the M1 bit(s); the given bit, when equal to 1, is used for indicating that a first-type subband corresponding to the given bit belongs to the K1 candidate subband(s); the given bit, when equal to 0, is used for indicating that a first-type subband corresponding to the given bit does not belong to the K1 candidate subband(s).

In a special case of the above example, a number of bits equal to 1 among the M1 bit(s) is not greater than the K1.

In one subembodiment, the K1 is fixed.

In one subembodiment, the K1 is configured through a higher layer signaling.

In one subembodiment, the K1 is not greater than a first threshold, the first threshold is a positive integer, and the first threshold is configured through a higher layer signaling, or the first threshold is fixed.

In one subembodiment, the K2 is equal to the K1, the K2 physical layer signaling(s) correspond(s) to K2 second DCI(s) respectively, and the K2 second DCI(s) is(are) used for indicating the K1 candidate subband(s) respectively.

In one affiliated embodiment of the above subembodiment, the K2 second DCI(s) is(are) transmitted in the K1 candidate subband(s) respectively.

In one subembodiment, any one of the K2 physical layer signaling(s) includes a Cyclic Redundancy Check (CRC), and the CRC is scrambled with a given ID.

In one affiliated embodiment of the above subembodiment, the given ID is 16 binary bits.

In one affiliated embodiment of the above subembodiment, all the given IDs are used for scrambling of the physical layer signaling(s).

In one affiliated embodiment of the above subembodiment, the given ID is a Common Control Radio Network Temporary Identifier (CC-RNTI).

In one affiliated embodiment of the above subembodiment, the given ID is a System Information Radio Network Temporary Identifier (SI-RNTI).

In one subembodiment, the M1 first-type subband(s) is(are) cell-specific.

In one subembodiment, any one of the M1 first-type subband(s) is one BWP.

In one subembodiment, any one of the M1 first-type subband(s) occupies same frequency domain resources within one RRC configuration periodicity.

In one subembodiment, the M1 first-type subband(s) all belong(s) to a given system bandwidth, any one of the M1 first-type subband(s) occupies a same frequency domain position of frequency domain resources in the given system bandwidth within one RRC configuration periodicity.

In one subembodiment, the phrase that the UE U2 receives a first signaling group refers that: the UE U2 blind detects the first signaling group in the M1 first-type subband(s).

In one subembodiment, before detecting the K1 first-type reference signal(s), the UE U2 does not know positions of time-frequency resources occupied by the K1 first-type reference signal(s).

In one subembodiment, any one of the K1 first-type reference signal(s) includes a Discovery Reference Signal (DRS).

In one subembodiment, any one of the K1 first-type reference signal(s) includes a Secondary Synchronization Signal (SSS).

In one subembodiment, any one of the K1 first-type reference signal(s) includes a Synchronization Signal Block (SSB).

In one subembodiment, the UE U2 acquires M1 first-type receiving quality(qualities) in M1 first-type time-frequency resource set(s) in the M1 first-type subband(s) respectively; the K1 first-type reference signal(s) occupy(occupies) K1 second-type time-frequency resource set(s) respectively; and the K1 second-type time-frequency resource set(s) correspond(s) to K1 first-type time-frequency resource set(s) among the M1 first-type time-frequency resource set(s) that is(are) located in the K1 candidate subband(s).

In one affiliated embodiment of the above subembodiment, any one of the M1 first-type receiving quality(qualities) includes a received energy.

In one affiliated embodiment of the above subembodiment, any one of the M1 first-type receiving quality(qualities) includes a Reference Signal Received Power (RSRP).

In one affiliated embodiment of the above subembodiment, any one of the M1 first-type receiving quality(qualities) includes a Reference Signal Received Quality (RSRQ).

In one affiliated embodiment of the above subembodiment, any one of the M1 first-type receiving quality(qualities) includes a Received Signal Strength Indicator (RSSI).

In one affiliated embodiment of the above subembodiment, any one of the M1 first-type receiving quality(qualities) includes a Signal to Noise Rate (SNR).

In one affiliated embodiment of the above subembodiment, any one of the M1 first-type receiving quality(qualities) includes a Signal to Inference Plus Noise Rate (SINR).

In one affiliated embodiment of the above subembodiment, the UE U2 detects K1 first-type reference signal(s) in K1 second-type time-frequency resource set(s), and the UE U2 determines that a first-type subband(s) occupied by the K1 second-type time-frequency resource set(s) correspond(s) to the K1 candidate subband(s) respectively.

In one affiliated embodiment of the above subembodiment, an energy(energies) received by the UE U2 in the K1 second-type time-frequency resource set(s) is(are) K1 maximum energy(energies) received in the M1 first-type time-frequency resource set(s), and the UE U2 determines that a first-type subband(s) occupied by the K1 second-type time-frequency resource set(s) correspond(s) to the K1 candidate subband(s) respectively.

In one subembodiment, the UE U2 blind detects the K1 first-type reference signal(s) in the M1 first-type subband(s).

In one affiliated embodiment of the above subembodiment, the blind detection refers to an energy detection.

In one affiliated embodiment of the above subembodiment, the blind detection refers to a signature sequence detection.

In one affiliated embodiment of the above subembodiment, the blind detection refers to a correlation detection.

In one subembodiment, the M1 energy detection(s) include(s) K1 candidate energy detection(s), the K1 candidate energy detection(s) is(are) performed by the base station N1 in the K1 candidate subband(s) respectively, and the K1 candidate energy detection(s) indicate(s) that the K1 candidate subband(s) is(are) not occupied respectively.

In one affiliated embodiment of the above subembodiment, the phrase not occupied refer to: not occupied by terminals other than the base station N1.

In one subembodiment, any one of the M1 energy detection(s) is a Listen Before Talk (LBT) process.

In one subembodiment, any one of the M1 energy detection(s) is a Clear Channel Assessment (CCA) process.

In one subembodiment, frequency domain resources occupied by the first time-frequency resource and frequency domain resources occupied by the second time-frequency resource are orthogonal in frequency domain.

In one subembodiment, the phrase that a frequency domain position of the second time-frequency resource is used for determining the second information group from the Q1 first-type information groups refers that: frequency domain resources occupied by the second time-frequency resource belong to a second subband, the second subband is one of Q1 candidate subbands, the second subband employs relevant information included in the second information group, and an index of the second subband in the Q1 candidate subbands is used for determining the second information group from the Q1 first-type information groups.

In one affiliated embodiment of the above subembodiment, the phrase that an index of the second subband in the Q1 candidate subbands is used for determining the second information group from the Q1 second-type information groups refers that: indexes of the Q1 candidate subbands are 0 to (Q1−1) respectively, an index of the second subband in the Q1 candidate subbands is s, the second information group is the (s+1)th first-type information among the Q1 first-type information groups, and the s is a positive integer not less than 0 but not greater than (Q1−1).

In one subembodiment, the phrase that a frequency domain position of the second time-frequency resource is used for determining the second information group from the Q1 first-type information groups refers that: frequency domain resources occupied by the second time-frequency resource are a second PRB set, the second PRB set is one of Q1 candidate PRB sets, the second radio signal employs relevant information included in the second information group, and an index of the second PRB set in the Q1 candidate PRB sets is used for determining the second information group from the Q1 first-type information groups.

In one affiliated embodiment of the above subembodiment, the phrase that an index of the second PRB set in the Q1 candidate PRB sets is used for determining the second information group from the Q1 first-type information groups refers that: indexes of the Q1 candidate PRB sets are 0 to (Q1−1) respectively, an index of the second PRB set in the Q1 candidate PRB sets is s, the second information group is the (s+1)th first-type information among the Q1 first-type information groups, and the s is a positive integer not less than 0 but not greater than (Q1−1).

In one subembodiment, the phrase that the first radio signal and the second radio signal are considered to be related includes: a spatial receiving parameter set of the first radio signal and a spatial receiving parameter set of the second radio signal are Quasi Co-Located (QCLed).

In one affiliated embodiment of the above subembodiment, the first radio signal includes an SSB, and the second radio signal includes a PDCCH.

In one affiliated embodiment of the above subembodiment, the base station N1 transmits the first radio signal and the second radio signal employing a same antenna port group.

In one affiliated embodiment of the above subembodiment, the UE U2 receives the first radio signal and the second radio signal employing a same antenna port group.

In one subembodiment, a spatial transmitting parameter set of a given radio signal in the disclosure includes at least one of an analog beamforming vector employed to transmit the given radio signal, a digital beamforming vector employed to transmit the given radio signal, a transmitting antenna port employed by the given radio signal or a transmitting antenna port group employed by the given radio signal; the given radio signal is the first radio signal in the disclosure, or the given radio signal is the second radio signal in the disclosure.

In one subembodiment, a spatial receiving parameter set of a given radio signal in the disclosure includes at least one of an analog beamforming vector employed to receive the given radio signal, a digital beamforming vector employed to receive the given radio signal, a receiving antenna port employed by the given radio signal or a receiving antenna port group employed by the given radio signal; the given radio signal is the first radio signal in the disclosure, or the given radio signal is the second radio signal in the disclosure.

In one subembodiment, the phrase that the first radio signal and the second radio signal are considered to be related includes: partial or all large-scale properties of the second radio signal are deduced from large-scale properties experienced by the first radio signal.

In one subembodiment, the phrase that the first radio signal and the second radio signal are considered to be related includes: partial or all large-scale properties of the first radio signal are deduced from large-scale properties experienced by the second radio signal.

In one subembodiment, the phrase that the first radio signal and the second radio signal are considered to be related includes: the first radio signal and the second radio signal are both associated to one or multiple same SSBs.

In one subembodiment, the phrase that the first radio signal and the second radio signal are considered to be related includes: the first radio signal and the second radio signal are both associated to one same SSB index.

In one subembodiment, large-scale properties of a given radio signal include one or more of delay spread, Doppler spread, Doppler shift, path loss, average gain, average delay, angle of arrival, angle of departure, spatial correlation, multiantenna related transmitting or multiantenna related receiving; the given radio signal is the first radio signal in the disclosure, or the given radio signal is the second radio signal in the disclosure.

In one affiliated embodiment of the above subembodiment, the multiantenna related receiving is spatial Rx parameters.

In one affiliated embodiment of the above subembodiment, the multiantenna related receiving is a receiving beam.

In one affiliated embodiment of the above subembodiment, the multiantenna related receiving is a receiving analog beamforming matrix.

In one affiliated embodiment of the above subembodiment, the multiantenna related receiving is a receiving beamforming vector.

In one affiliated embodiment of the above subembodiment, the multiantenna related receiving is receiving spatial filtering.

In one affiliated embodiment of the above subembodiment, the multiantenna related transmitting is spatial Tx parameters.

In one affiliated embodiment of the above subembodiment, the multiantenna related transmitting is a transmitting beam.

In one affiliated embodiment of the above subembodiment, the multiantenna related transmitting is a transmitting analog beamforming matrix.

In one affiliated embodiment of the above subembodiment, the multiantenna related transmitting is a transmitting beamforming vector.

In one affiliated embodiment of the above subembodiment, the multiantenna related transmitting is transmitting spatial filtering.

In one subembodiment, the first radio signal and the second radio signal include a third DCI and a fourth DCI respectively.

In one affiliated embodiment of the above subembodiment, the phrase that the first radio signal and the second radio signal are considered to be related includes: the third DCI and the fourth DCI correspond to a same DCI format.

In one affiliated embodiment of the above subembodiment, the phrase that the first radio signal and the second radio signal are considered to be related includes: the third DCI and the fourth DCI correspond to a same payload size.

In one affiliated embodiment of the above subembodiment, the phrase that the first radio signal and the second radio signal are considered to be related includes: the third DCI and the fourth DCI correspond to a same number of information bits.

In one affiliated embodiment of the above subembodiment, the phrase that the first radio signal and the second radio signal are considered to be related includes: the third DCI may be any one of Q3 candidate DCI formats; the fourth DCI may be any one of the Q3 candidate DCI formats; and the Q3 is a positive integer greater than 1.

In one affiliated embodiment of the above subembodiment, the third DCI and the fourth DCI both include a target field, and the phrase that the first radio signal and the second radio signal are considered to be related includes: a value of the target field in the third DCI is related to a value of the target field in the fourth DCI. The first time-frequency resource is located behind the second time-frequency resource in time domain.

In one example of the above affiliated embodiment, the target field is a Transmission Power Control (TPC) field.

In one example of the above affiliated embodiment, the target field is a Downlink Assignment Index (DAI) field.

In one subembodiment, a Hybrid Automatic Repeat reQuest (HARQ) process number corresponding to the first radio signal is the same as a HAQR process number corresponding to the second radio signal, and the phrase that the first radio signal and the second radio signal are considered to be related includes: the first radio signal and the second radio signal belong to one same HARQ process.

In one subembodiment, the first radio signal and the second radio signal carry a first bit block and a second bit block respectively, and the phrase that the first radio signal and the second radio signal are considered to be related includes: the first bit block and the second bit block are the same.

In one subembodiment, each of the Q1 first-type information groups includes an index; only when an index of the first information group in the Q1 first-type information groups is the same as an index of the second information group in the Q1 first-type information groups, the first information group and the second information group are one same first-type information group among the Q1 first-type information groups.

In one subembodiment, the air interface in the disclosure corresponds to an interface between the UE 201 and the NR node B203 illustrated in Embodiment 2.

In one subembodiment, the air interface in the disclosure is carried through a wireless channel.

In one subembodiment, the antenna port group in the disclosure includes P antenna port(s), and the P is a positive integer.

In one affiliated embodiment of the above subembodiment, the P is equal to 1.

Embodiment 6

Figure 6:
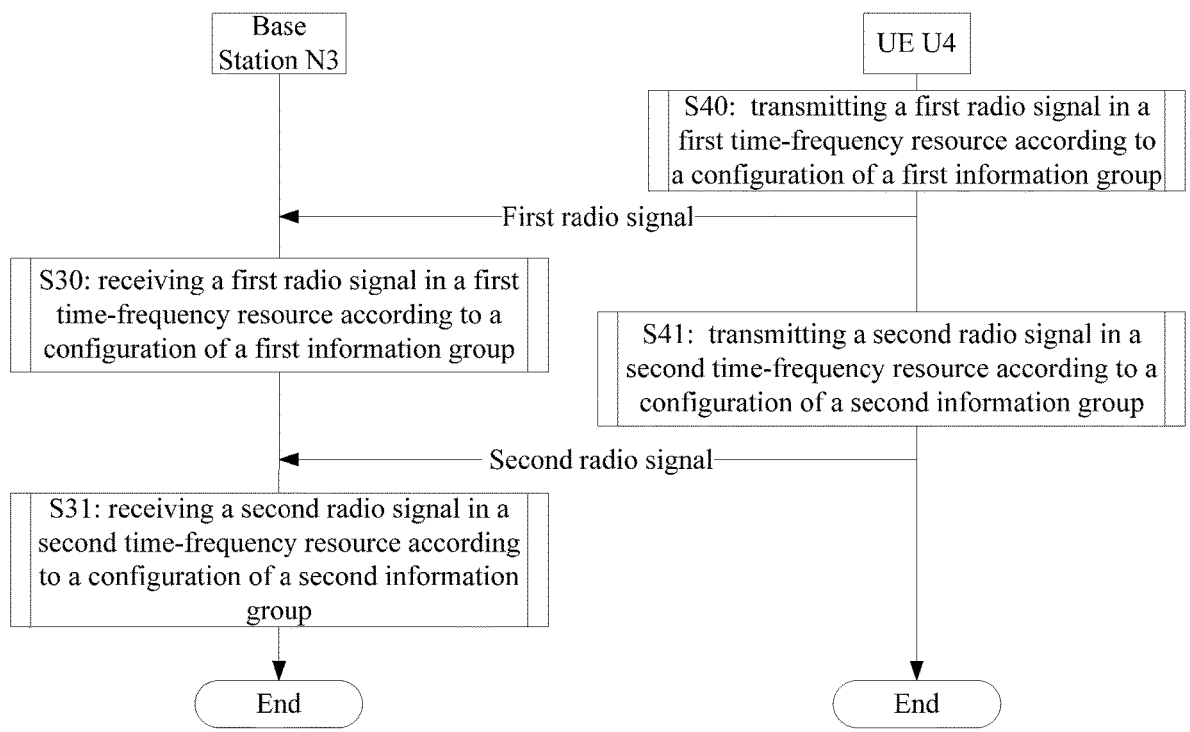
FIG. 6 is a flowchart of a first radio signal and a second radio signal according to one embodiment of the disclosure.

Embodiment 6 illustrates a flowchart of a first radio signal and a second radio signal, as shown in FIG. 6. In FIG. 6, a base station N3 is a maintenance base station for a serving cell of a UE U4.

The base station N3 receives a first radio signal in a first time-frequency resource according to a configuration of a first information group in S30, and receives a second radio signal in a second time-frequency resource according to a configuration of a second information group in S31.

The UE U4 transmits a first radio signal in a first time-frequency resource according to a configuration of a first information group in S40, and transmits a second radio signal in a second time-frequency resource according to a configuration of a second information group in S41.

In Embodiment 6, the first information group is one of the Q1 first-type information groups; a frequency domain position of the first time-frequency resource is used for determining the first information group from the Q1 first-type information groups; the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related.

In one subembodiment, S30 in Embodiment 6 may replace S16 in Embodiment 5.

In one subembodiment, S40 in Embodiment 6 may replace S25 in Embodiment 5.

In one subembodiment, S31 in Embodiment 6 may replace S17 in Embodiment 5.

In one subembodiment, S41 in Embodiment 6 may replace S26 in Embodiment 5.

In one subembodiment, the phrase that the first radio signal and the second radio signal are considered to be related includes: a spatial transmitting parameter set of the first radio signal is QCLed with a spatial transmitting parameter set of the second radio signal.

In one affiliated embodiment of the above subembodiment, the first radio signal includes an SRS, and the second radio signal includes one of a Physical Uplink Control Channel (PUCCH) or a Physical Uplink Shared Channel (PUSCH).

In one affiliated embodiment of the above subembodiment, the first radio signal includes a PUSCH, and the second radio signal includes a PUCCH.

In one affiliated embodiment of the above subembodiment, the first radio signal includes a Demodulation Reference Signal (DMRS), and the second radio signal includes one of a PUCCH or a PUSCH.

In one affiliated embodiment of the above subembodiment, the UE U4 transmits the first radio signal and the second radio signal employing a same antenna port group.

In one affiliated embodiment of the above subembodiment, the base station N3 receives the first radio signal and the second radio signal employing a same antenna port group.

Embodiment 7

Figure 7:
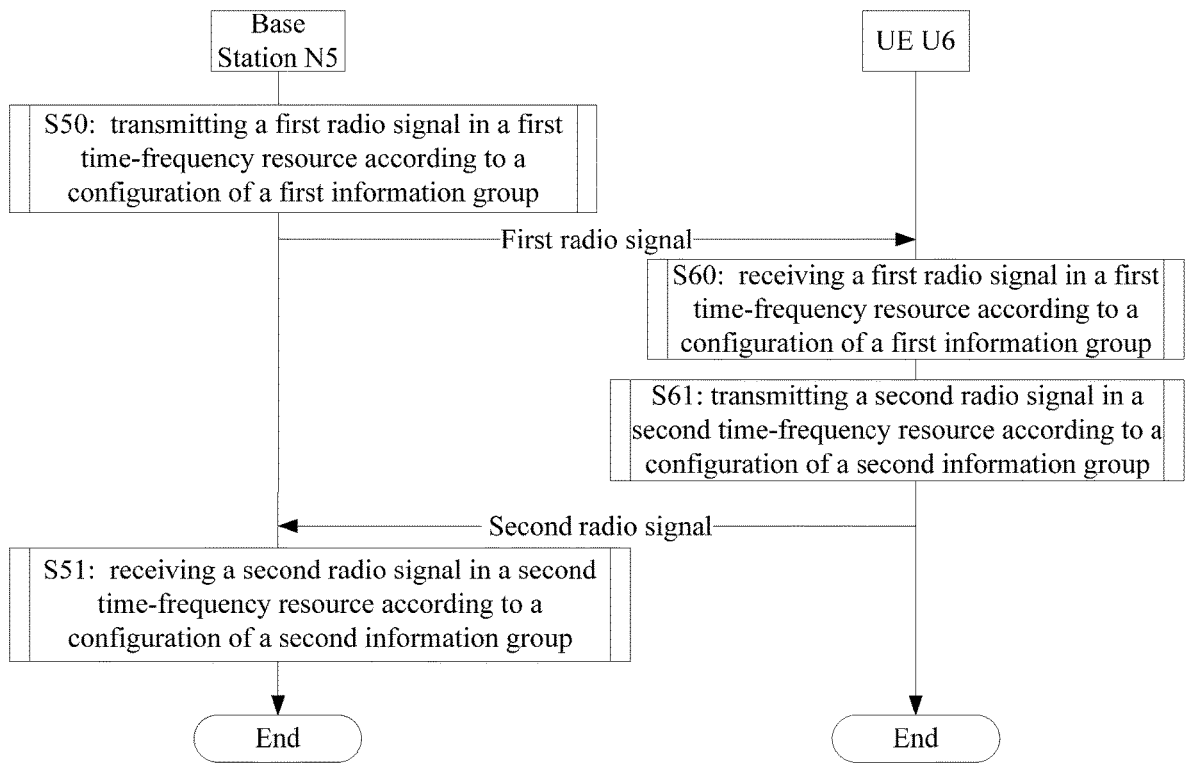
FIG. 7 is a flowchart of a first radio signal and a second radio signal according to another embodiment of the disclosure.

Embodiment 7 illustrates another flowchart of a first radio signal and a second radio signal, as shown in FIG. 7. In FIG. 7, a base station N5 is a maintenance base station for a serving cell of a UE U6.

The base station N5 transmits a first radio signal in a first time-frequency resource according to a configuration of a first information group in S50, and receives a second radio signal in a second time-frequency resource according to a configuration of a second information group in S51.

The UE U6 receives a first radio signal in a first time-frequency resource according to a configuration of a first information group in S60, and transmits a second radio signal in a second time-frequency resource according to a configuration of a second information group in S61.

In Embodiment 7, the first information group is one of the Q1 first-type information groups; a frequency domain position of the first time-frequency resource is used for determining the first information group from the Q1 first-type information groups; the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related.

In one subembodiment, S50 in Embodiment 7 may replace S16 in Embodiment 5.

In one subembodiment, S60 in Embodiment 7 may replace S25 in Embodiment 5.

In one subembodiment, S51 in Embodiment 7 may replace S17 in Embodiment 5.

In one subembodiment, S61 in Embodiment 7 may replace S26 in Embodiment 5.

In one subembodiment, the phrase that the first radio signal and the second radio signal are considered to be related includes: a spatial receiving parameter set of the first radio signal is QCLed with a spatial transmitting parameter set of the second radio signal; the first operate is receive, and the second operate is transmit.

In one affiliated embodiment of the above subembodiment, the first radio signal includes an SSB, and the second radio signal includes a Physical Random Access Channel (PRACH) for the SSB.

In one affiliated embodiment of the above subembodiment, the first radio signal includes a CSI-RS, and the second radio signal includes a PUCCH or PUSCH for the SSB.

In one affiliated embodiment of the above subembodiment, the first radio signal includes a PDCCH, and the second radio signal includes a PUSCH scheduled by the PDCCH.

In one affiliated embodiment of the above subembodiment, the UE U6 determines a spatial transmitting parameter set of the second radio signal according to a spatial receiving parameter set of the first radio signal.

Embodiment 8

Figure 8:
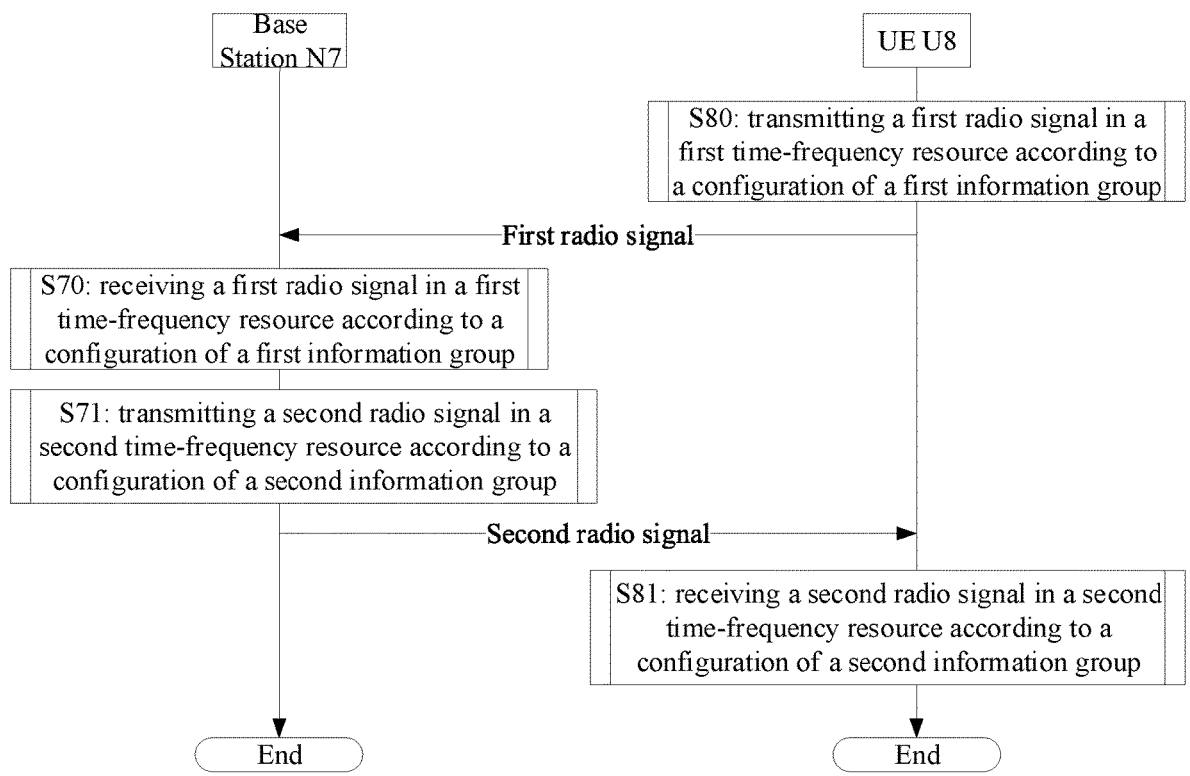
FIG. 8 is a flowchart of a first radio signal and a second radio signal according to another embodiment of the disclosure.

Embodiment 8 illustrates another flowchart of a first radio signal and a second radio signal, as shown in FIG. 8. In FIG. 8, a base station N7 is a maintenance base station for a serving cell of a UE U8.

The base station N7 receives a first radio signal in a first time-frequency resource according to a configuration of a first information group in S70, and transmits a second radio signal in a second time-frequency resource according to a configuration of a second information group in S71.

The UE U8 transmits a first radio signal in a first time-frequency resource according to a configuration of a first information group in S80, and receives a second radio signal in a second time-frequency resource according to a configuration of a second information group in S81.

In Embodiment 8, the first information group is one of the Q1 first-type information groups; a frequency domain position of the first time-frequency resource is used for determining the first information group from the Q1 first-type information groups; the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related.

In one subembodiment, S70 in Embodiment 8 may replace S16 in Embodiment 5.

In one subembodiment, S80 in Embodiment 8 may replace S25 in Embodiment 5.

In one subembodiment, S71 in Embodiment 8 may replace S17 in Embodiment 5.

In one subembodiment, S81 in Embodiment 8 may replace S26 in Embodiment 5.

In one subembodiment, the phrase that the first radio signal and the second radio signal are considered to be related includes: a spatial transmitting parameter set of the first radio signal is QCLed with a receiving transmitting parameter set of the second radio signal.

In one affiliated embodiment of the above subembodiment, the first radio signal includes a PRACH, and the second radio signal includes a response to the PRACH.

In one affiliated embodiment of the above subembodiment, the first radio signal includes a PUSCH, and the second radio signal includes a feedback to the PUSCH.

In one affiliated embodiment of the above subembodiment, the UE U8 determines a spatial receiving parameter set of the second radio signal according to a spatial transmitting parameter set of the first radio signal.

Embodiment 9

Figure 9:
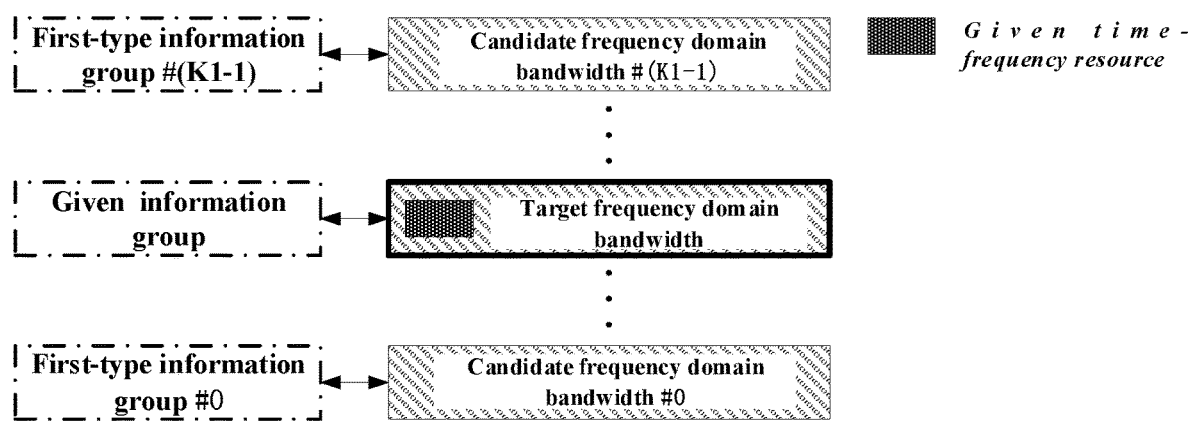
FIG. 9 is a diagram illustrating a given time frequency resource and a given information group according to one embodiment of the disclosure.

Embodiment 9 illustrates a diagram of a given time-frequency resource and a given information group, as shown in FIG. 9. In FIG. 9, frequency domain resources occupied by the given time-frequency resource belong to a target frequency domain bandwidth, and the target frequency domain bandwidth is one of K1 candidate frequency domain bandwidths; a position of the target frequency domain bandwidth in the K1 candidate frequency domain bandwidths is used for determining the given information group from the Q1 first-type information groups; the Q1 first-type information groups include a first-type information group #0 to a first-type information group #(Q1−1) shown in FIG. 9; the K1 candidate frequency domain bandwidths include a candidate frequency domain bandwidth #0 to a frequency domain bandwidth #(K1−1) shown in FIG. 9.

In one subembodiment, the given time-frequency resource is the first time-frequency resource in the disclosure, the target frequency domain bandwidth is the first subband in the disclosure, the K1 candidate frequency domain bandwidths are the K1 candidate subbands in the disclosure respectively, and the given information group is the first information group in the disclosure.

In one subembodiment, the given time-frequency resource is the second time-frequency resource in the disclosure, the target frequency domain bandwidth is the second subband in the disclosure, the K1 candidate frequency domain bandwidths are the K1 candidate subbands in the disclosure respectively, and the given information group is the second information group in the disclosure.

In one subembodiment, the given time-frequency resource is the first time-frequency resource in the disclosure, the target frequency domain bandwidth is frequency domain resources occupied by the first PRB set in the disclosure, the K1 candidate frequency domain bandwidths are frequency domain resources occupied by K1 candidate PRB sets among the Q1 candidate PRB sets in the disclosure respectively, and the Q1 is not less than the K1.

In one subembodiment, the phrase that a position of the target frequency domain bandwidth in the K1 candidate frequency domain bandwidths is used for determining the given information group from the Q1 first-type information groups refers that: the K1 is equal to the Q1, the target frequency domain bandwidth is a candidate frequency domain bandwidth #i among the K1 candidate frequency domain bandwidths, the given information group is a first-type information group #i among the Q1 first-type information groups, and the i is a positive integer not less than 0 but not greater than (K1−1).

In one subembodiment, the K1 candidate frequency domain bandwidths are indexed with #0, #1, . . . , #(K1−1) respectively.

In one subembodiment, the K1 candidate frequency domain bandwidths are arranged in an order from low to high according to center frequency points.

In one subembodiment, the K1 candidate frequency domain bandwidths are arranged in an order from low to high according to frequency points of lowest subcarriers.

In one subembodiment, the K1 candidate frequency domain bandwidths are arranged in an order from low to high according to frequency points of highest subcarriers.

In one subembodiment, the K1 candidate frequency domain bandwidths are arranged in an order appearing in a configuration signaling.

In one subembodiment, the Q1 first-type information groups are indexed with #0, #1, . . . #(Q1−1) respectively.

Embodiment 10

Figure 10:
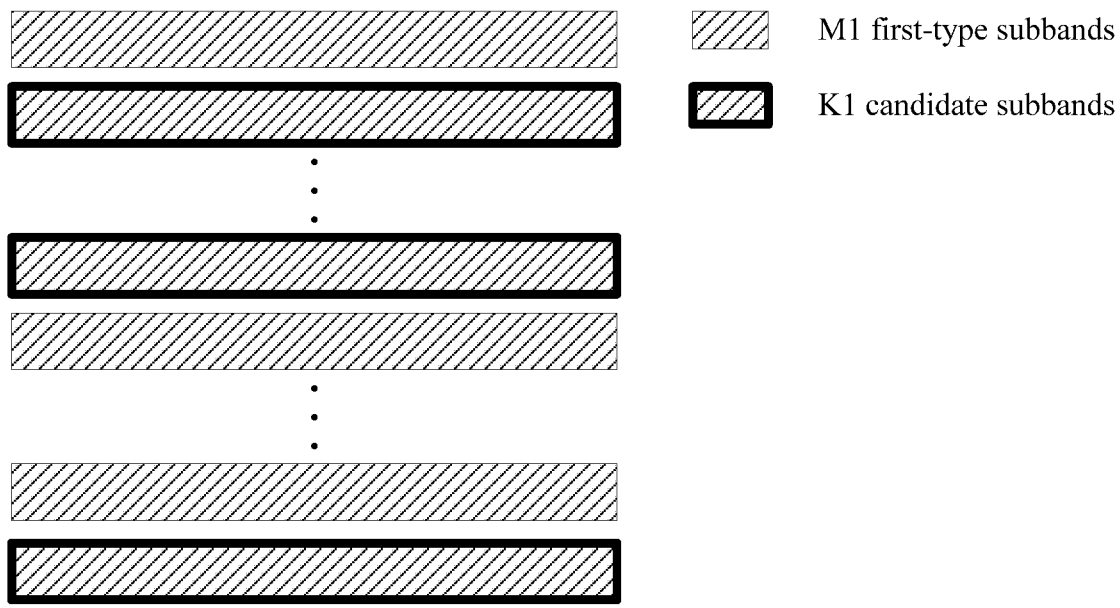
FIG. 10 is a diagram illustrating K1 candidate subbands according to one embodiment of the disclosure.

Embodiment 10 illustrates a diagram of K1 candidate subbands, as shown in FIG. 10. In FIG. 10, each bold-line rectangle filled with slashes represents the K1 candidate subbands in the disclosure, and each rectangle filled with slashes represents the M1 first-type subbands in the disclosure.

In one subembodiment, any two different candidate subbands among the K1 candidate subbands are orthogonal in frequency domain.

In one subembodiment, any two different first-type subbands among the M1 first-type subbands are orthogonal in frequency domain.

In one subembodiment, frequency domain resources occupied by the M1 first-type subbands all belong to a given system bandwidth, and a frequency domain position of any one of the M1 first-type subbands in the given system bandwidth is fixed.

In one subembodiment, frequency domain resources occupied by the M1 first-type subbands all belong to a given system bandwidth, and a frequency domain position of any one of the M1 first-type subbands in the given system bandwidth keeps unchanged within one RRC signaling configuration periodicity.

In one subembodiment, frequency domain positions of the K1 candidate subbands in the M1 first subbands change dynamically.

In one subembodiment, the base station in the disclosure determines the K1 candidate subbands from the M1 first-type subbands through channel detection.

Embodiment 11

Figure 11:
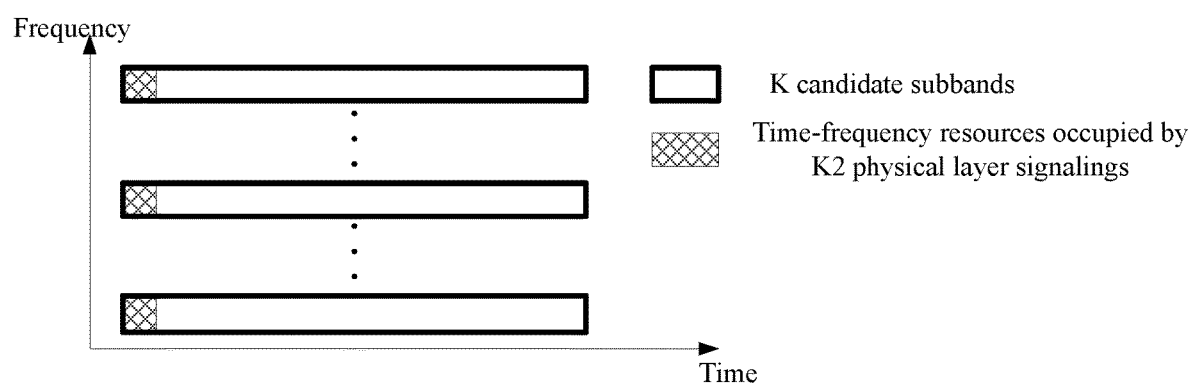
FIG. 11 is a diagram illustrating a first signaling group according to one embodiment of the disclosure.

Embodiment 11 illustrates a diagram of a first signaling group, as shown in FIG. 11. In FIG. 11, the first signaling group includes K2 physical layer signalings, the K2 is equal to the K1 in the disclosure, and the K2 physical layer signalings are transmitted in the K1 candidate subbands respectively.

In one subembodiment, CRCs included in the K2 physical layer signalings are all scrambled with a CC-RNTI.

In one subembodiment, the K2 changes with the dynamic change of the K1.

In one subembodiment, the K2 physical layer signalings are used for indicating that the K2 candidate subbands are occupied by the base station in the disclosure respectively.

Embodiment 12

Figure 12:
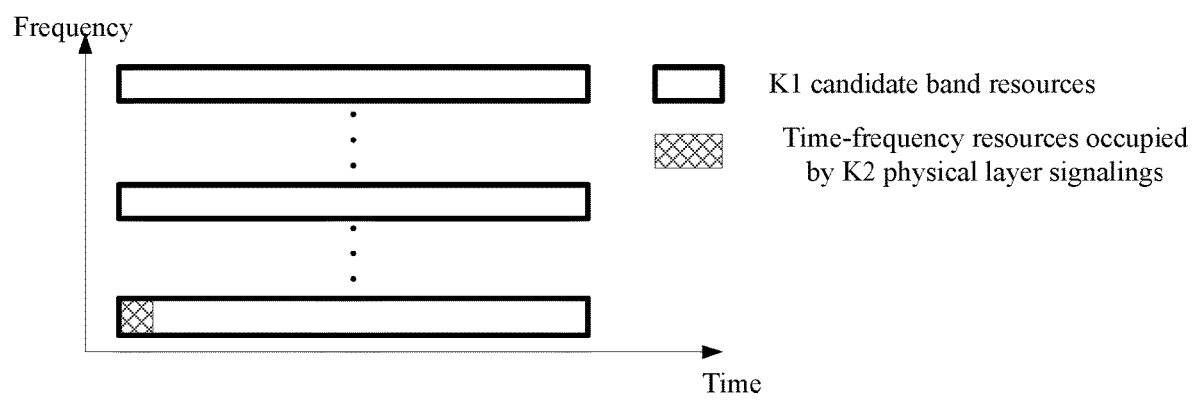
FIG. 12 is a diagram illustrating a first signaling group according to another embodiment of the disclosure.

Embodiment 12 illustrates another diagram of a first signaling group, as shown in FIG. 12. In FIG. 12, the first signaling group includes K2 physical layer signaling(s), the K2 physical layer signaling(s) is(are) transmitted in K2 candidate subband(s) among the K1 candidate subbands, and the K2 is a positive integer less than the K1.

In one subembodiment, the K2 is equal to 1, and the first signaling group is transmitted in one of the K1 candidate subbands.

In one affiliated embodiment of the above subembodiment, a candidate subband transmitting the first signaling group is a candidate subband with a lowest center frequency point among the K1 candidate subbands.

In one affiliated embodiment of the above subembodiment, a candidate subband transmitting the first signaling group is a candidate subband with a highest center frequency point among the K1 candidate subbands.

In one affiliated embodiment of the above subembodiment, a candidate subband transmitting the first signaling group is a candidate subband with a frequency point of a highest subcarrier arranged lowest among the K1 candidate subbands.

In one affiliated embodiment of the above subembodiment, a candidate subband transmitting the first signaling group is a candidate subband with a frequency point of a highest subcarrier arranged highest among the K1 candidate subbands.

In one subembodiment, information bits included in the K2 physical layer signalings are the same.

In one subembodiment, any one of the K2 physical layer signaling(s) is used for indicating the K1 candidate subbands from the K1 first-type subbands.

Embodiment 13

Figure 13:
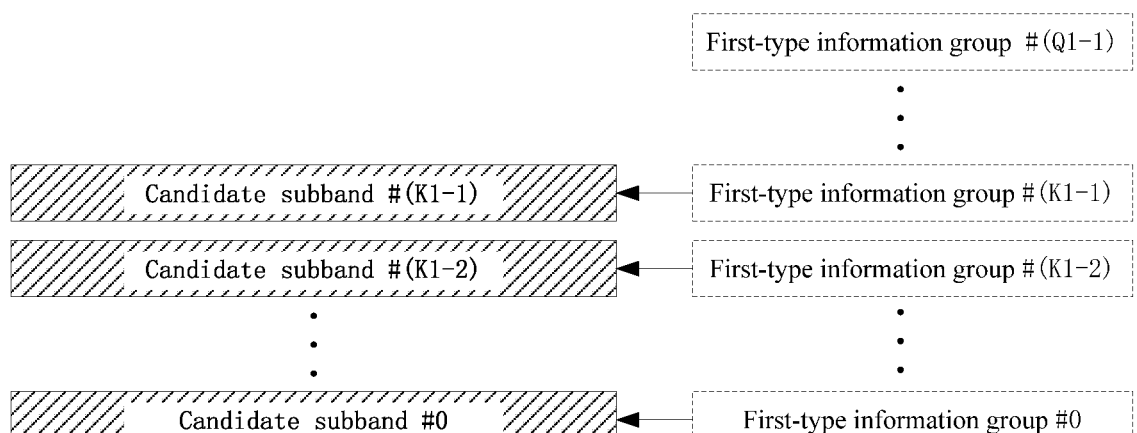
FIG. 13 is a diagram illustrating Q1 first-type information groups according to one embodiment of the disclosure.

Embodiment 13 illustrates a diagram of Q1 first-type information groups, as shown in FIG. 13. In FIG. 13, the Q1 first-type information groups are a first-type information group #0 to a first-type information group #(Q1−1) respectively, the first-type information group #0 to a first-type information group #(K1−1) among the first-type information group #0 to the first-type information group #(Q1−1) are used for K1 candidate subbands in the disclosure respectively, and the Q1 is not less than the K1.

In one subembodiment, the first-type information group #0 to the first-type information group #(K1−1) are configured to a candidate subband #0 to a candidate subband #(K1−1) respectively.

In one subembodiment, any one of the Q1 first-type information groups is transmitted through an RRC signaling.

In one subembodiment, any one of the Q1 first-type information groups is UE specific.

In one subembodiment, the Q1 is equal to the K1.

Embodiment 14

Figure 14:
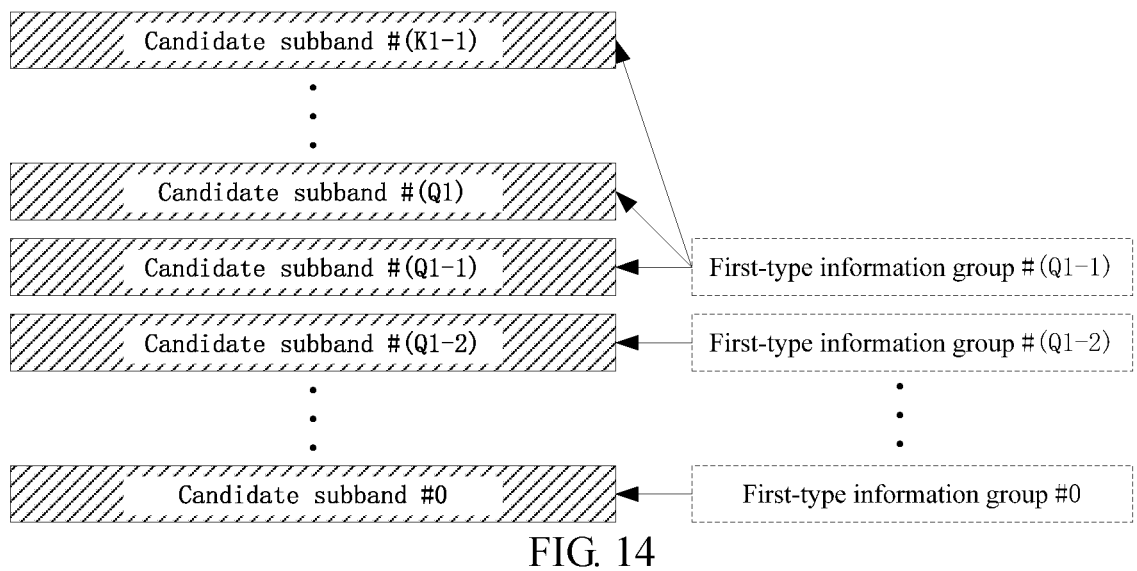
FIG. 14 is a diagram illustrating Q1 first-type information groups according to another embodiment of the disclosure.

Embodiment 14 illustrates another diagram of Q1 first-type information groups, as shown in FIG. 14. In FIG. 14, the Q1 first-type information groups are a first-type information group #0 to a first-type information group #(Q1−1) respectively, the Q1 is less than the K1, and the first-type information group #0 to a first-type information group #(Q1−1) are used for K1 candidate subbands in the disclosure.

In one subembodiment, the first-type information group #0 to the first-type information group #(Q1−1) are configured to a candidate subband #0 to a candidate subband #(Q1−1) respectively.

In one subembodiment, the first-type information group #(Q1−1) is further configured to a candidate subband #Q1 to a candidate subband #(K1−1).

In one subembodiment, any one of the Q1 first-type information groups is transmitted through an RRC signaling.

In one subembodiment, any one of the Q1 first-type information groups is UE specific.

Embodiment 15

Figure 15:
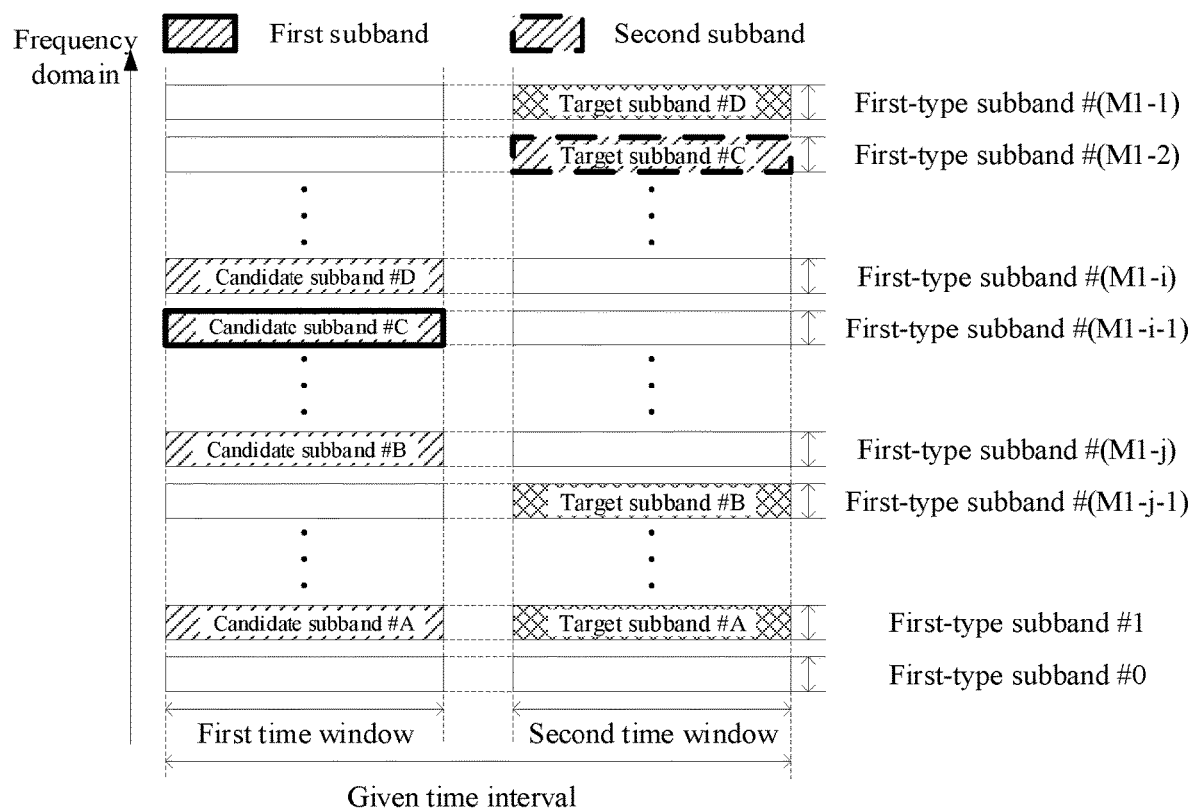
FIG. 15 is a diagram illustrating a first time-frequency resource and a second time-frequency resource according to one embodiment of the disclosure.

Embodiment 15 illustrates a diagram of a first time-frequency resource and a second time-frequency resource, as shown in FIG. 15. In FIG. 15, frequency domain resources occupied by the first time-frequency resource belong to the first subband in the disclosure, and time domain resources occupied by the first time-frequency resource belong to a first time window; frequency domain resources occupied by the second time-frequency resource belong to the second subband in the disclosure, and time domain resources occupied by the second time-frequency resource belong to a second time window; the first time window and the second time window are orthogonal in time domain; the first subband is one of the K1 candidate subbands in the disclosure in the first time window; the K1 candidate subbands include a candidate subband #A, a candidate subband #B, a candidate subband #C and a candidate subband #D shown in FIG. 15; the second subband is one of K1 target subbands in the disclosure in the second first time window; the K1 target subbands include a target subband #A, a target subband #B, a target subband #C and a target subband #D shown in FIG. 15; the candidate subband #A to the candidate subband #D are a subset belonging to the M1 first-type subbands in the disclosure; and the target subband #A to the target subband #D are a subset belonging to the M1 first-type subbands in the disclosure.

In one subembodiment, at least one of the candidate subband #A, the candidate subband #B, the candidate subband #C and the candidate subband #D occupies a frequency resource different from that occupied by any one of the target subband #A, the target subband #B, the target subband #C and the target subband #D.

In one subembodiment, durations of both the first time window and the second time window are equal to T ms in time domain.

In one subembodiment, the Q1 first-type information groups in the disclosure include a first-type information group #0, a first-type information group #1, a first-type information group #2 or a first-type information group #3.

In one affiliated embodiment of the above subembodiment, configuration information included in the first-type information group #0 is employed by the candidate subband #A in the first time window, and configuration information included in the first-type information group #0 is employed by the target subband #A in the second time window, In one affiliated embodiment of the above subembodiment, configuration information included in the first-type information group #1 is employed by the candidate subband #B in the first time window, and configuration information included in the first-type information group #1 is employed by the target subband #B in the second time window, In one affiliated embodiment of the above subembodiment, configuration information included in the first-type information group #2 is employed by the candidate subband #C in the first time window, and configuration information included in the first-type information group #2 is employed by the target subband #C in the second time window, In one affiliated embodiment of the above subembodiment, configuration information included in the first-type information group #3 is employed by the candidate subband #D in the first time window, and configuration information included in the first-type information group #3 is employed by the target subband #D in the second time window, In one subembodiment, the Q1 first-type information groups keep unchanged in a given time interval shown in FIG. 15.

In one subembodiment, the given time interval corresponds to a minimum configuration periodicity of RRC signaling of the UE in the disclosure.

In one subembodiment, the first time window occupies a positive integer number of consecutive slot(s) in time domain.

In one subembodiment, the first time window occupies one consecutive slot in time domain.

In one subembodiment, the second time window occupies a positive integer number of consecutive slot(s) in time domain.

In one subembodiment, the second time window occupies one consecutive slot in time domain.

In one subembodiment, the given time interval occupies a positive integer number of consecutive slot(s) in time domain.

In one subembodiment, the given time interval is equal to a minimum configuration periodicity of RRC signaling of the UE in the disclosure.

Embodiment 16

Figure 16:
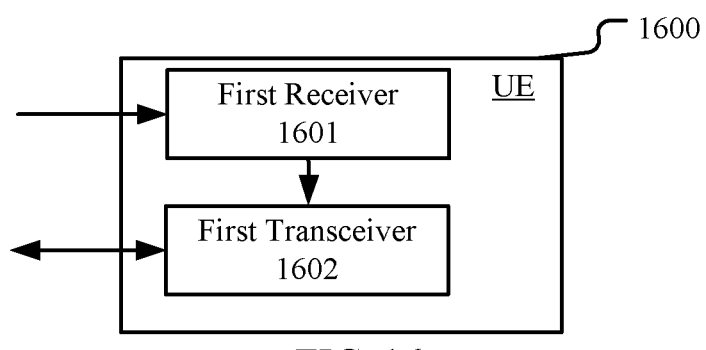
FIG. 16 is a structure block diagram illustrating a processing device in a UE according to one embodiment of the disclosure.

Embodiment 16 illustrates a structure block diagram of a processing device in a UE, as shown in FIG. 16. In FIG. 26, the processing device 1600 in the UE includes a first receiver 1601 an a first transceiver 1602.

The first receiver 1601 receives Q1 first-type information groups.

The first transceiver 1602 first operates a first radio signal in a first time-frequency resource according to a configuration of a first information group.

In Embodiment 16, the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first operate is transmit, or the first operate is receive.

In one subembodiment, the first transceiver 1602 further determines K1 candidate subband(s); the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer.

In one subembodiment, the first transceiver 1602 further receives a first signaling group, the first signaling group is used for indicating K1 candidate subband(s); the first signaling group includes K2 physical layer signaling(s), and the K2 is a positive integer.

In one subembodiment, the first transceiver 1602 further receives first information; the first information is used for indicating M1 first-type subband(s); the K1 candidate subband(s) is(are) a subset belonging to the M1 first-type subband(s); the M1 is a positive integer not less than the K1; and the first information is transmitted through an air interface.

In one subembodiment, the first transceiver 1602 further detects K1 first-type reference signal(s) in the M1 first-type subband(s); and a detection(s) for the K1 first-type reference signal(s) is(are) used for determining the K1 candidate subband(s).

In one subembodiment, the first transceiver 1602 second operates a second radio signal in a second time-frequency resource according to a configuration of a second information group; the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second operate is transmit, or the second operate is receive.

In one subembodiment, the first receiver 1601 includes at least the former two of the receiver 456, the receiving processor 452 or the controller/processor 490 illustrated in Embodiment 4.

In one subembodiment, the first transceiver 1602 includes at least the former four of the transmitter/receiver 456, the transmitting processor 455, the receiving processor 452 or the controller/processor 490 illustrated in Embodiment 4.

Embodiment 17

Figure 17:
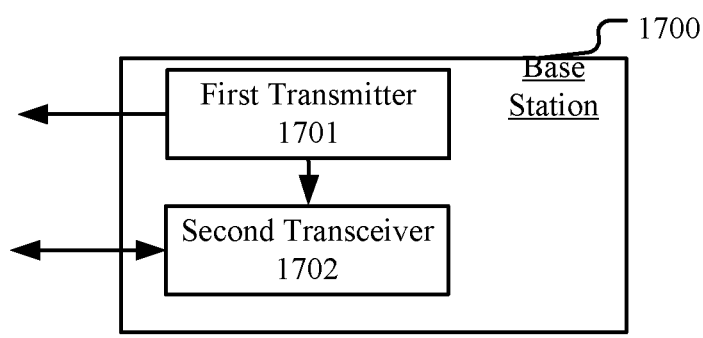
FIG. 17 is a structure block diagram illustrating a processing device in a base station according to one embodiment of the disclosure.

Embodiment 17 illustrates a structure block diagram of a processing device in a base station, as shown in FIG. 17. In FIG. 17, the processing device 1700 in the base station includes a first transmitter 1701 and a second transceiver 1702.

The first transmitter 1701 transmits Q1 first-type information groups.

The second transceiver 1702 first processes a first radio signal in a first time-frequency resource according to a configuration of a first information group.

In Embodiment 17, the first information group is one of the Q1 first-type information groups; a frequency domain position of the first time-frequency resource is used for determining the first information group from the Q1 first-type information groups; each of the Q1 first-type information groups includes at least one of relevant information to a subcarrier spacing, relevant information to a cyclic prefix or relevant information to a bandwidth, and the Q1 is a positive integer greater than 1; and the first process is receive, or the first process is transmit.

In one subembodiment, the second transceiver 1702 further determines K1 candidate subband(s); the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer.

In one subembodiment, the second transceiver 1702 further transmits a first signaling group; the first signaling group is used for indicating K1 candidate subband(s); the first signaling group includes K2 physical layer signaling(s), and the K2 is a positive integer.

In one subembodiment, the second transceiver 1702 further transmits first information; the first information is used for indicating M1 first-type subband(s); the K1 candidate subband(s) is(are) a subset belonging to the M1 first-type subband(s); the M1 is a positive integer not less than the K1; and the first information is transmitted through an air interface.

In one subembodiment, the second transceiver 1702 further performs M1 energy detection(s) for the M1 first-type subband(s) respectively; the second transceiver transmits K1 first-type reference signal(s) in the K1 candidate subband(s) respectively; the M1 energy detection(s) is(are) used for determining that the K1 candidate subband(s) is(are) not occupied, and a detection(s) for the K1 first-type reference signal(s) is(are) used for determining the K1 candidate subband(s).

In one subembodiment, the second transceiver 1702 further second processes a second radio signal in a second time-frequency resource according to a configuration of a second information group; the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second process is receive, or the second process is transmit.

In one subembodiment, the first transmitter includes at least the former two of the transmitter 416, the transmitting processor 415 or the controller/processor 440 illustrated in Embodiment 4.

In one subembodiment, the second transceiver 1702 includes at least the former four of the receiver/transmitter 416, the transmitting processor 415, the receiving processor 412 or the controller/processor 440 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE, the terminal and the UE in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, gNBs (NR nodes B), Transmitter Receiver Points (TRPs), and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:

receiving first information;

receiving Q1 first-type information groups;

determining K1 candidate subband(s) and first operating a first radio signal in a first time-frequency resource according to a configuration of a first information group;

wherein the first information group is one of the Q1 first-type information groups; a frequency domain position of the first time-frequency resource is used for determining the first information group from the Q1 first-type information groups; each of the Q1 first-type information groups comprises at least one of relevant information to a subcarrier spacing, relevant information to a cyclic prefix or relevant information to a bandwidth, and the Q1 is a positive integer greater than 1; and the first operating is transmitting, or the first operating is receiving; the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer; the first information is used for indicating M1 first-type subband(s); the K1 candidate subband(s) is(are) a subset belonging to the M1 first-type subband(s); the M1 is a positive integer not less than the K1; and the first information is transmitted through an air interface.

2. The method according to claim 1, comprising:

receiving a first signaling group;

wherein the first signaling group is used for indicating K1 candidate subband(s); the first signaling group comprises K2 physical layer signaling(s), and the K2 is a positive integer.

3. The method according to claim 1, comprising:

detecting K1 first-type reference signal(s) in the M1 first-type subband(s);

wherein a detection(s) for the K1 first-type reference signal(s) is(are) used for determining the K1 candidate subband(s).

4. The method according to claim 1, comprising:

second operating a second radio signal in a second time-frequency resource according to a configuration of a second information group;

wherein the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second operating is transmitting, or the second operating is receiving.

5. A method in a base station for wireless communication, comprising:

transmitting first information;

transmitting Q1 first-type information groups;

determining K1 candidate subband(s) and first processing a first radio signal in a first time-frequency resource according to a configuration of a first information group;

wherein the first information group is one of the Q1 first-type information groups; a frequency domain position of the first time-frequency resource is used for determining the first information group from the Q1 first-type information groups; each of the Q1 first-type information groups comprises at least one of relevant information to a subcarrier spacing, relevant information to a cyclic prefix or relevant information to a bandwidth, and the Q1 is a positive integer greater than 1; and the first processing is receiving, or the first processing is transmitting; the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer; the first information is used for indicating M1 first-type subband(s); the K1 candidate subband(s) is(are) a subset belonging to the M1 first-type subband(s); the M1 is a positive integer not less than the K1; and the first information is transmitted through an air interface.

6. The method according to claim 5, comprising:
transmitting a first signaling group;
the first signaling group is used for indicating K1 candidate subband(s); the first signaling group comprises K2 physical layer signaling(s), and the K2 is a positive integer.

7. The method according to claim 5, comprising:
performing M1 energy detection(s) for the M1 first-type subband(s) respectively; and
transmitting K1 first-type reference signal(s) in the K1 candidate subband(s) respectively;
wherein the M1 energy detection(s) is(are) used for determining that the K1 candidate subband(s) is(are) not occupied, and a detection(s) for the K1 first-type reference signal(s) is(are) used for determining the K1 candidate subband(s).

8. The method according to claim 5, comprising:
second processing a second radio signal in a second time-frequency resource according to a configuration of a second information group;
wherein the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second processing is receiving, or the second processing is transmitting.

9. A UE for wireless communication, comprising:
a first receiver, to receive Q1 first-type information groups; and
a first transceiver, to receive first information, to determine K1 candidate subband(s), to first operate a first radio signal in a first time-frequency resource according to a configuration of a first information group;
wherein the first information group is one of the Q1 first-type information groups; a frequency domain position of the first time-frequency resource is used for determining the first information group from the Q1 first-type information groups; each of the Q1 first-type information groups comprises at least one of relevant information to a subcarrier spacing, relevant information to a cyclic prefix or relevant information to a bandwidth, and the Q1 is a positive integer greater than 1; and the first operate is transmit, or the first operate is receive; the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer; the first information is used for indicating M1 first-type subband(s); the K1 candidate subband(s) is(are) a subset belonging to the M1 first-type subband(s); the M1 is a positive integer not less than the K1; and the first information is transmitted through an air interface.

10. The UE according to claim 9,
wherein
the first transceiver receives a first signaling group; the first signaling group is used for indicating K1 candidate subband(s); the first signaling group comprises K2 physical layer signaling(s), and the K2 is a positive integer.

11. The UE according to claim 9, wherein the first transceiver detects K1 first-type reference signal(s) in the M1 first-type subband(s); and a detection(s) for the K1 first-type reference signal(s) is(are) used for determining the K1 candidate subband(s).

12. The UE according to claim 9, wherein the first transceiver second operates a second radio signal in a second time-frequency resource according to a configuration of a second information group; the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second operate is transmit, or the second operate is receive.

13. A base station for wireless communication, comprising:
a first transmitter, to transmit Q1 first-type information groups; and
a second transceiver, to transmit first information, to determine K1 candidate subband(s), to first process a first radio signal in a first time-frequency resource according to a configuration of a first information group;
wherein the first information group is one of the Q1 first-type information groups; a frequency domain position of the first time-frequency resource is used for determining the first information group from the Q1 first-type information groups; each of the Q1 first-type information groups comprises at least one of relevant information to a subcarrier spacing, relevant information to a cyclic prefix or relevant information to a bandwidth, and the Q1 is a positive integer greater than 1; and the first process is receive, or the first process is transmit; the second transceiver determines K1 candidate subband(s); the first time-frequency resource belongs to a first subband in frequency domain, the first subband is one of the K1 candidate subband(s), a position of the first subband in the K1 candidate subband(s) is used for determining the first information group from the Q1 first-type information groups, and the K1 is a positive integer; the first information is used for indicating M1 first-type subband(s); the K1 candidate subband(s) is(are) a subset belonging to the M1 first-type subband(s); the M1 is a positive integer not less than the K1; and the first information is transmitted through an air interface.

14. The base station according to claim 13,
wherein
the second transceiver transmits a first signaling group; the first signaling group is used for indicating K1 candidate subband(s); the first signaling group comprises K2 physical layer signaling(s), and the K2 is a positive integer.

15. The base station according to claim 13, wherein the second transceiver performs M1 energy detection(s) for the M1 first-type subband(s) respectively; the second transceiver transmits K1 first-type reference signal(s) in the K1 candidate subband(s) respectively; the M1 energy detection(s) is(are) used for determining that the K1 candidate subband(s) is(are) not occupied, and a detection(s) for the K1 first-type reference signal(s) is(are) used for determining the K1 candidate subband(s).

16. The base station according to claim 13, wherein the second transceiver second processes a second radio signal in a second time-frequency resource according to a configuration of a second information group; the second information group is one of the Q1 first-type information groups; the first time-frequency resource and the second time-frequency resource are orthogonal in time domain; a frequency domain position of the second time-frequency resource is used for determining the second information group from the Q1 first-type information groups; only when the first information group and the second information group are one same first-type information group among the Q1 first-type information groups, the first radio signal and the second radio signal are considered to be related; and the second process is receive, or the second process is transmit.

* * * * *